US007822496B2

(12) United States Patent
Asada et al.

(10) Patent No.: US 7,822,496 B2
(45) Date of Patent: Oct. 26, 2010

(54) AUDIO SIGNAL PROCESSING METHOD AND APPARATUS

(75) Inventors: Kohei Asada, Kanagawa (JP); Tetsunori Itabashi, Kanagawa (JP)

(73) Assignee: Sony Corporation (JP)

( * ) Notice: Subject to any disclaimer, the term of this patent is extended or adjusted under 35 U.S.C. 154(b) by 478 days.

(21) Appl. No.: 10/533,612

(22) PCT Filed: Oct. 10, 2003

(86) PCT No.: PCT/JP03/13082

§ 371 (c)(1),
(2), (4) Date: Apr. 29, 2005

(87) PCT Pub. No.: WO2004/047490

PCT Pub. Date: Jun. 3, 2004

(65) Prior Publication Data

US 2006/0050897 A1 Mar. 9, 2006

(30) Foreign Application Priority Data

Nov. 15, 2002 (JP) ............................ 2002-332565
Nov. 18, 2002 (JP) ............................ 2002-333313

(51) Int. Cl.
*G06F 17/00* (2006.01)

(52) U.S. Cl. .......................................... 700/94; 381/98

(58) Field of Classification Search ................ 381/71.8, 381/71.1, 303, 308, 98, 102, 94.2; 700/94
See application file for complete search history.

(56) References Cited

U.S. PATENT DOCUMENTS 4,817,149 A 3/1989 Myers
4,868,878 A * 9/1989 Kunugi et al. .................. 381/1
5,802,180 A 9/1998 Abel et al.
5,815,578 A * 9/1998 Foster et al. .................. 381/1
6,052,470 A 4/2000 Mouri
6,801,631 B1 * 10/2004 North ........................ 381/336

(Continued)

FOREIGN PATENT DOCUMENTS

JP 3-159500 7/1991

(Continued)

OTHER PUBLICATIONS

Supplementary European Search Report, EP 03754090, dated Mar. 11, 2009.

*Primary Examiner*—Vivian Chin
*Assistant Examiner*—Joseph Saunders, Jr.
(74) *Attorney, Agent, or Firm*—Lerner, David, Littenberg, Krumholz & Mentlik, LLP

(57) ABSTRACT

An audio signal processing method and apparatus in which the apparatus includes a plurality of digital filters, each supplied with an audio signal, and a speaker array. Outputs from the digital filters are supplied to speakers included in the speaker array to form a sound field. A predetermined delay time is set in each of the digital filters, to thereby form, in the sound field, a point where the sound pressure is higher than in the surrounding and a point where the sound pressure is lower than in the surrounding. A low-pass filter characteristic is given to the frequency response of the digital filters and a pseudo pulse train is used to enhance the setting resolution of the delay time.

20 Claims, 23 Drawing Sheets

U.S. PATENT DOCUMENTS

| | | | | |
|---|---|---|---|---|
| 7,054,448 | B2 * | 5/2006 | Yoshino et al. | 381/59 |
| 2004/0131338 | A1 * | 7/2004 | Asada et al. | 386/96 |
| 2004/0151325 | A1 * | 8/2004 | Hooley et al. | 381/18 |

FOREIGN PATENT DOCUMENTS

| | | | |
|---|---|---|---|
| JP | 5-083799 | A | 4/1993 |
| JP | 8-019084 | | 1/1996 |
| JP | 8-191225 | A | 7/1996 |
| WO | 94/01981 | A2 | 1/1994 |
| WO | WO 02078388 | A2 * | 10/2002 |

* cited by examiner

AUDIO SIGNAL PROCESSING METHOD AND APPARATUS

TECHNICAL FIELD

The present invention relates to an audio signal processing method and apparatus suitably applicable to a home theater etc.

This application claims the priority of the Japanese Patent Application No. 2002-332565 filed on Nov. 15, 2002 and No. 2002-333313 filed on Nov. 18, 2002, the entireties of which are incorporated by reference herein.

BACKGROUND ART

As a speaker system suitable applicable to a home theater, AV (audio and visual) system, etc., speaker arrays are disclosed in the Japanese Patent Application Laid Open Nos. 233591 of 1997 and 30381 of 1993. FIG. 1 shows one of the conventional speaker arrays, as a typical example. The speaker array generally indicated with a reference numeral 10 includes a plurality of speakers (speaker units) SP0 to SPn disposed in an array. In this speaker array, n=255 and each of the speakers has a diameter of several centimeters, for example. Thus, the speakers SP0 to SPn are actually disposed two-dimensionally in a plane. In the following description, however, it is assumed that the speakers SP0 to SPn are disposed in a horizontal line for the simplicity of illustration and explanation.

An audio signal is supplied from a source SC to delay circuits DL0 to DLn where it will be delayed by predetermined times τ0 to τn, respectively, the delayed audio signals are supplied to speakers SP0 to SPn, respectively, via power amplifiers PA0 to PAn, respectively. It should be noted that the delay times τ0 to τn given to the audio signal in the delay circuits DL0 to DLn will be described in detail later.

Thus, the sound waves delivered from the speakers SP0 to SPn will be combined together to provide a sound pressure to the listener wherever he or she positions himself or herself in relation to the speakers. On this account, in a sound field formed by the speakers SP0 to SPn as shown in FIG. 1, a predetermined sound pressure increasing point Ptg and predetermined sound pressure decreasing point Pnc are defined as follows:

Ptg: Point where the listener should be given as much sound as possible or the sound pressure should be increased more than in the surrounding Pnc: Point where the listener should be given as less sound as possible or the sound pressure should be decreased more than in the surrounding.

Generally, an arbitrary point can be taken as the sound pressure increasing point Ptg in a system shown in FIG. 2 or 3.

More specifically, on the assumption that in the system shown in FIG. 2, distances from the speakers SP0 to SPn to the sound pressure increasing point Ptg are L0 to Ln, respectively, and the acoustic velocity is s, the delay times τ0 to τn given to the sound waves in the delay circuits DL0 to DLn are set as follows in the system shown in FIG. 2:

$$\tau 0=(Ln-L0)/s$$

$$\tau 1=(Ln-L1)/s$$

$$\tau 2=(Ln-L2)/s$$

$$\ldots$$

$$\tau n=(Ln-Ln)/s=0$$

Thus, the audio signal from a source SC will be converted by the speakers SP0 to SPn into sound waves and the sound waves will be delivered from the respective speakers SP0 to SPn with delay times τ0 to τn, respectively. Therefore, all the sound waves will simultaneously arrive at the sound pressure increasing point Ptg and the sound pressure at the sound pressure increasing point Ptg will be higher than in the surrounding.

More specifically, in the system shown in FIG. 2, the distances from the speakers SP0 to SPn to the sound pressure increasing point Ptg are different from each other, which will cause a time lag from one sound wave to another. The time lag is compensated by a corresponding one of the delay circuits DL0 to DLn to focus the sound at the sound pressure increasing point Ptg. It should be noted that the system of this type will be referred to as "focusing type system" hereinafter and the sound pressure increasing point Ptg also be referred to as "focus" wherever appropriate hereinafter.

In the system shown in FIG. 3, the delay times τ0 to τn to be given to the sound waves in the delay circuits DL0 to DLn are so set that the phase wavefronts of the traveling waves (sound waves) from the speakers SP0 to SPn will be the same, to thereby make the sound waves directive and take direction toward the sound pressure increasing point Ptg as an intended direction. This system is also considered as a version of the focusing type in which distances L0 to Ln are infinitely large. It should be noted that the system of this type will be referred to as "directive type system" hereinafter and the direction in which the phase wavefronts of the sound waves are in a line be referred to as "intended direction" hereinafter.

In the speaker array 10, appropriate setting of the delay times τ0 to τn permits to form a focus Ptg at an arbitrary point within an a sound field and direct the sound waves in the same direction. Also, in both the above focusing and directive type systems, since outputs from the speakers SP0 to SPn are combined out of phase in any other position than the point Ptg, they will eventually be averaged and the sound pressure be lower. Further, in these systems, the sound outputs from the speaker array 10, once reflected by a wall surface, may be focused at the point Ptg and directed toward the point Ptg.

However, the aforementioned speaker array 10 is destined primarily to implement a sound pressure increasing point Ptg by focusing or directing the sound waves with the delay times τ0 to τn. The amplitude of an audio signal supplied to the speakers SP0 to SPn will only change the sound pressure.

On this account, the directivity of the speaker array may be utilized to lower the sound pressure at the sound pressure increasing point Ptg. For this purpose, the speaker array 10 may be rearranged for a main lobe to be formed in the direction of the sound pressure increasing point Ptg while reducing the side lobe or for null sound to be detected in the direction toward the sound pressure decreasing point Pnc, for example.

To this end, it is necessary to make the size of the entire speaker array sufficiently large in comparison with the wavelength of the sound wave by increasing the number n of the speakers SP0 to SPn. However, this is practically very difficult to implement. Otherwise, a change of sound pressure will have an influence on the sound pressure increasing point Ptg to which the sound waves are focused and directed.

Moreover, multi-channel stereo sound has to be taken in consideration for a home theater, AV system and the like. Namely, as the DVD players are more and more popular, multi-channel stereo sound sources are increasing. Thus, the user should provide as many speakers as the channels. However, a rather large space will be required for installation of so many speakers.

Also, to have the delay circuits DL0 to DLn delay an audio signal supplied from the source SC without degradation, each of the delay circuits DL0 to DLn have to be formed from a digital circuit. More particularly, the delay circuit may be formed from a digital filter. Actually, in many AV systems, since the source SC is a digital device such as a DVD player and the audio signal is a digital one, each of the delay circuits DL0 to DLn will be formed from a digital circuit in so many cases.

However, if each of the delay circuits DL0 to DLn is formed from a digital circuit, the time resolution of an audio signal supplied to the speakers SP0 to SPn will be limited by the digital audio signal and sampling period in the delay circuits DL0 to DLn and hence cannot be made smaller than the sampling period. It should be noted that when the sampling frequency is 48 kHz, the sampling period will be about 20.8 μsec and the sound wave will travel about 7 mm for one sampling period. Also, a 10-hz audio signal will be delayed by one sampling period equivalent to a phase delay of 70 deg.

Therefore, the phase of the sound wave from each of the speakers SP0 to SPn cannot sufficiently be focused at the point Ptg with the result that the size of the focus Ptg, that is, a sound image as viewed from the listener, will be larger or become not definite as the case may be.

Also, the sound wave phase will be less uneven in any place other than the focus Ptg and thus no sufficient reduction of the sound pressure can be expected in the other place than the point Ptg. Thus, the sound image will become large and not definite and will be less effective than usual.

DISCLOSURE OF THE INVENTION

Accordingly, the present invention has an object to overcome the above-mentioned drawbacks of the related art by providing an improved and novel audio signal processing method and apparatus.

The above object can be attained by providing an audio signal processing method including, according to the present invention, the steps of supplying an audio signal to each of a plurality of digital filters; supplying outputs from the plurality of digital filters to each of a plurality of speakers forming a speaker array to form a sound field; setting a predetermined delay time to be given in each of the plurality of digital filters, to thereby form, in the sound field, a first point where the sound pressure is higher than in the surrounding and a second point where the sound pressure is lower than in the surrounding; and adjusting the amplitude characteristic of the plurality of digital filters to give a low-pass filter characteristic to the frequency response of the audio signal at the second point.

In the above audio signal processing method according to the present invention, the point where the sound pressure is higher than in the surrounding is set by setting a delay time to be given in each of the digital filters and the point where the sound pressure is lower than in the surrounding is set by adjusting the amplitude characteristic of the digital filters.

Also the above object can be attained by providing an audio signal processing method, for example, a signal processing method in which a digital signal is delayed by a predetermined time, the method including, according to the present invention, the steps of dividing the predetermined delay time into an integer part and decimal part in units of a sampling period of the digital signal; over-sampling an impulse response including a delay time represented by at least the decimal part of the predetermined delay time to provide a sample train and down-sampling the sample train to provide pulse-waveform data of the sampling period; and setting the pulse-waveform data as a filter factor of a digital filter and supplying the digital signal to the digital filters which operate for the sampling period.

The above audio signal processing method implements a fraction of the delay time required for the digital filters to delay the digital signal by appropriate delay times.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 1 is a schematic block diagram of a speaker array including in a speaker system used in a home theater, AV system or the like.

BEST MODE FOR CARRYING OUT THE INVENTION

First, the present invention will be outlined. In the present invention, since sound outputs from speakers included in a speaker array are combined in a space to provide response signals at various points, these points are interpreted as pseudo digital filters. With prediction of response signals from "points Pnc where the listener should be given as less sound pressure as possible" and changing the amplitudes of the sounds while not changing the delay given to each of the speakers, the frequency characteristic is controlled in such a manner as to form a digital filter.

With control of the frequency characteristic, the sound pressure at the Pnc where the listener should be given as less sound pressure as possible is reduced and the band in which the sound pressure can be reduced is increased. Also, the sound pressure is reduced as naturally as possible.

Further according to the present invention, an impulse response representing a delay is over-sampled with a higher frequency than the sampling frequency of this audio signal processing system and represented by a higher resolution than the sampling period of the system. Data on the impulse is down-sampled with the sampling frequency of the system to provide a train including a plurality of pulses, and the pulse train is stored in a data base. When a digital audio signal is delayed by $\tau 0$ to $\tau n$, the data stored in the data base is set for a digital filter. Since this processing makes it possible to set a delay time with a higher-precision time resolution than a unit delay time defined by the sampling frequency of the system, the responses at the sound pressure increasing point Ptg and sound pressure decreasing point Pnc can be controlled more accurately.

Next, the speaker array 10 will be analyzed.

Figure 2:
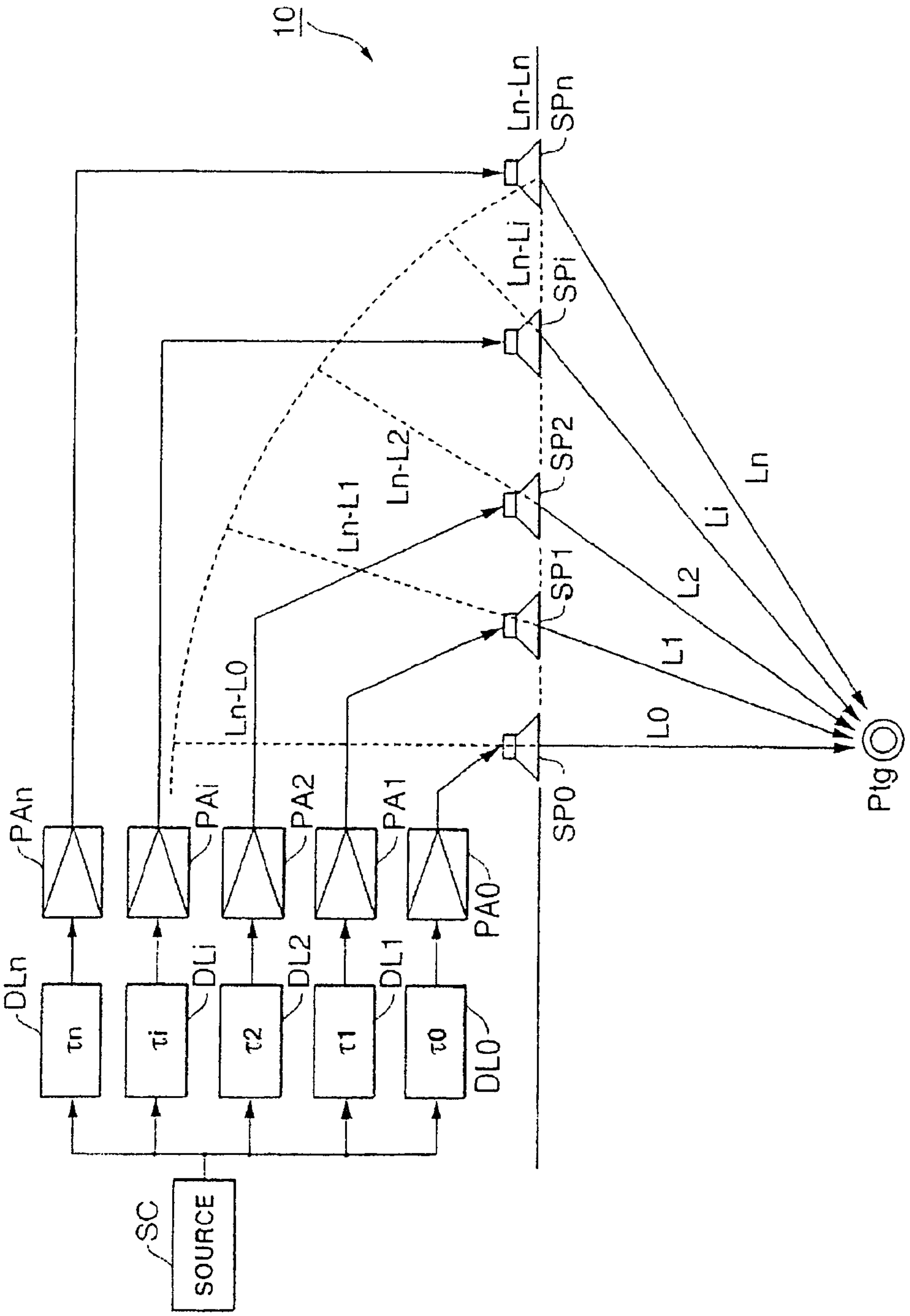
FIG.2 (PRIOR ART)
FIG. 2 is a schematic block diagram showing how a sound field is formed by speakers included in the speaker array.

For the simplicity of the illustration and explanation, it is assumed here that the speaker array 10 is formed from n speakers SP0 to SPn disposed horizontally in a line and the speaker array 10 is constructed as the focusing type system as shown in FIG. 2.

Figure 4:
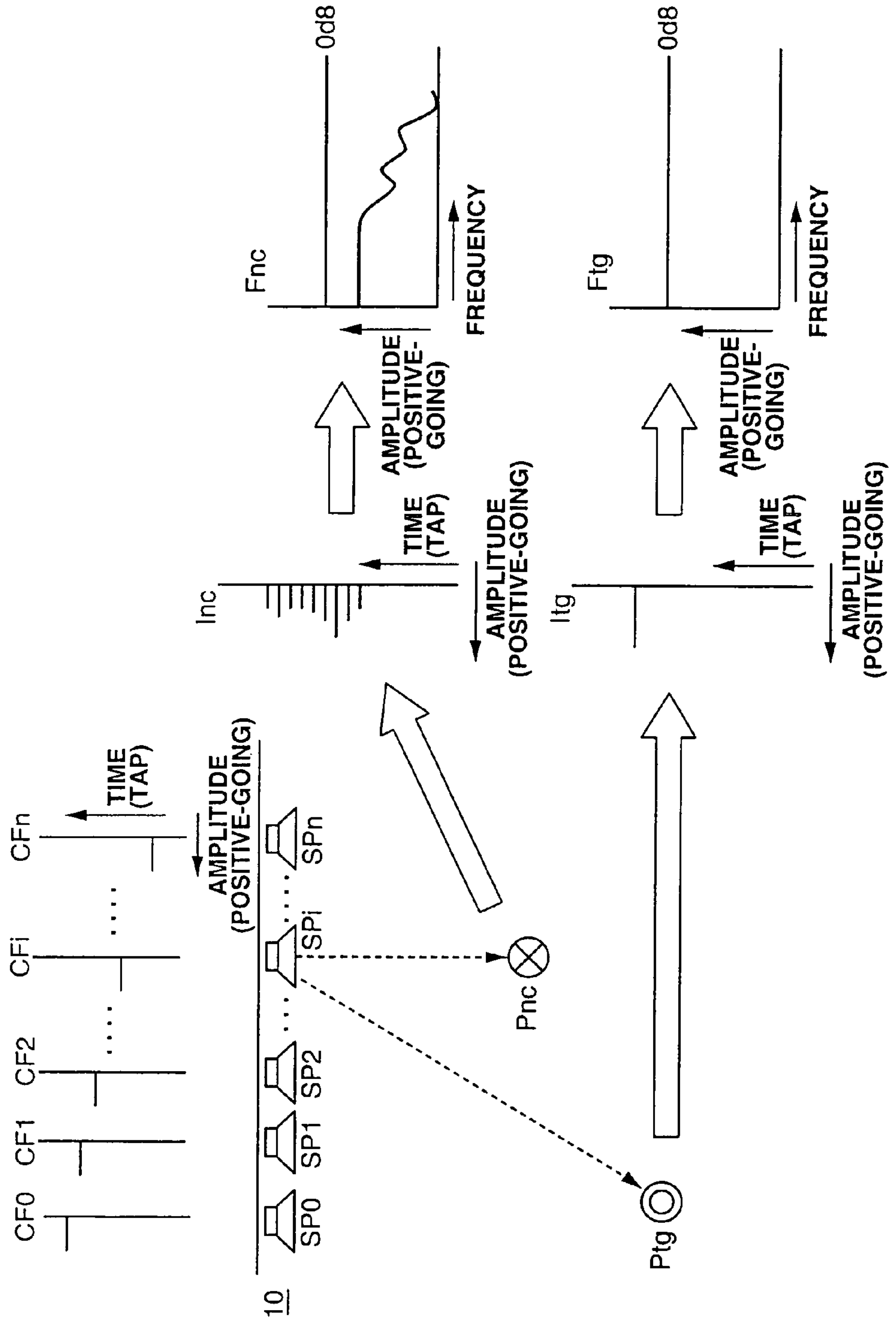
FIG. 4 explains a sound pressure increasing point Ptg and sound pressure decreasing point Pnc in appropriate positions in a sound field.

Here, it is assumed that each of delay circuits DL0 to DLn of the focusing type system is formed from an FIR (finite impulse response) digital filter. Also, it is assumed that the filter factors of the FIR digital filters DL0 to DLn are represented by CF0 to CFn, respectively, as shown in FIG. 4.

Also, it is assumed that an impulse is supplied to each of the FIR digital filters DL0 to DLn and an output sound from the speaker array 10 is measured at the points Ptg and Pnc. It should be noted that this measurement is made with the sampling frequency of a reproduction system including the digital filters DL0 to DLn or with a higher one than the system sampling frequency.

Then, each of response signals measured at the points Ptg and Pnc will be a sum resulting from acoustic addition of sounds delivered from all the speakers SP0 to SPn and spatially propagated. It is assumed here for the better understanding of the following explanation that output signals from the speakers SP0 to SPn are impulse signals delayed by the digital filters DL0 to DLn, respectively. It should be noted that the response signals added together after spatially propagated will be referred to as "space synthesis impulse response" hereinafter.

Figure 1:
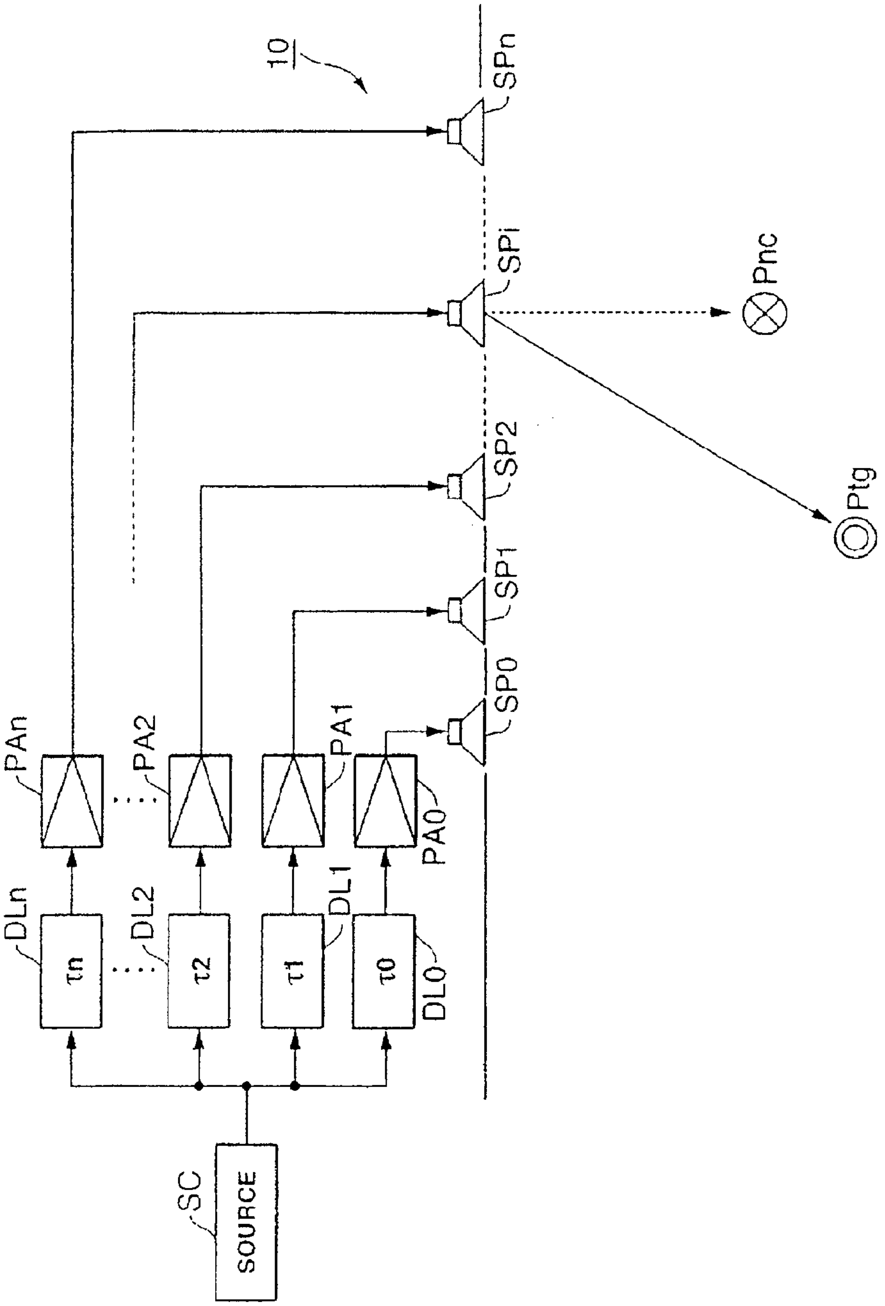
FIG.1 (PRIOR ART)

Since the delay component of each of the digital filters DL0 to DLn is set for focusing the sound output at the point Ptg, the space synthesis impulse response Itg measured at the point Ptg will be a large impulse as shown in FIG. 1. Also, the frequency response (amplitude part) Ftg of the space synthesis impulse response Itg will be flat in the entire frequency band as shown in FIG. 4 because the time waveform takes the form of an impulse. Therefore, the sound pressure will be increased at the point Ptg.

Note that although the space synthesis impulse response Itg will not actually be any accurate impulse because of the frequency characteristic of each of the speakers SP0 to SPn, change in frequency characteristic during spatial propagation, reflection characteristic of a wall present in the path of sound propagation, displacement of the time base defined by the sampling frequency, etc., it will be represented herein by an ideal model for the simplicity of the explanation. The displacement of the time base defined by the sampling frequency will be described in detail later.

On the other hand, the space synthesis impulse response Inc measured at the point Pnc is considered as a combination of impulses each carrying time base information. As will be seen from FIG. 4, the space synthesis impulse response Inc is a signal having impulses dispersed therein within some range. It should be noted that although the impulse response Inc at the point Pnc is equally spaced pulse trains as shown in FIG. 4, the spaces between the pulse train are normally at random. Since information on the position of the point Pnc is not included in each of filter factors CF0 to CFn and all the original filter factors CF0 to CFn are based on a positive-going impulse, the frequency response Fnc of the space synthesis impulse response Inc is also a combination of impulses all being positive-going ones.

As a result, as apparent from the design principle of the FIR digital filter, the frequency response Fnc will be flat in a low-frequency band and decline more with a higher frequency as also shown in FIG. 4, that is, it will have a characteristic approximate to that of the low-pass filter. At this, since the space synthesis impulse response Itg at the sound pressure increasing point Ptg is a large impulse while the space synthesis impulse response Inc at the point Pnc is a signal having dispersed impulses, the frequency response Fnc at the point Pnc will be lower in level than the frequency response Ftg at the point Ptg. Therefore, the sound pressure will be decreased at the point Pnc. On the assumption that the space synthesis impulse response Inc is a spatial FIR digital filter, the FIR digital filter Inc is originally composed of a sum of impulse amplitude values including the time factors of the filter factors CF0 to CFn, the frequency response Fnc can be changed by changing the contents (amplitude, phase, etc.) of the filter factors CF0 to CFn. That is, by changing the filter factors CF0 to CFn, it is possible to change the frequency response Fnc of the sound pressure at the sound pressure decreasing point Pnc.

As above, by forming each of the delay circuits DL0 to DLn from a FIR digital filter and selecting filter factors CF0 to CFn for the digital filters, respectively, the sound pressure increasing and decreasing points Ptg and Pnc can be set in appropriate positions in a sound field.

Next, the speaker array in a closed space will be explained.

Figure 3:
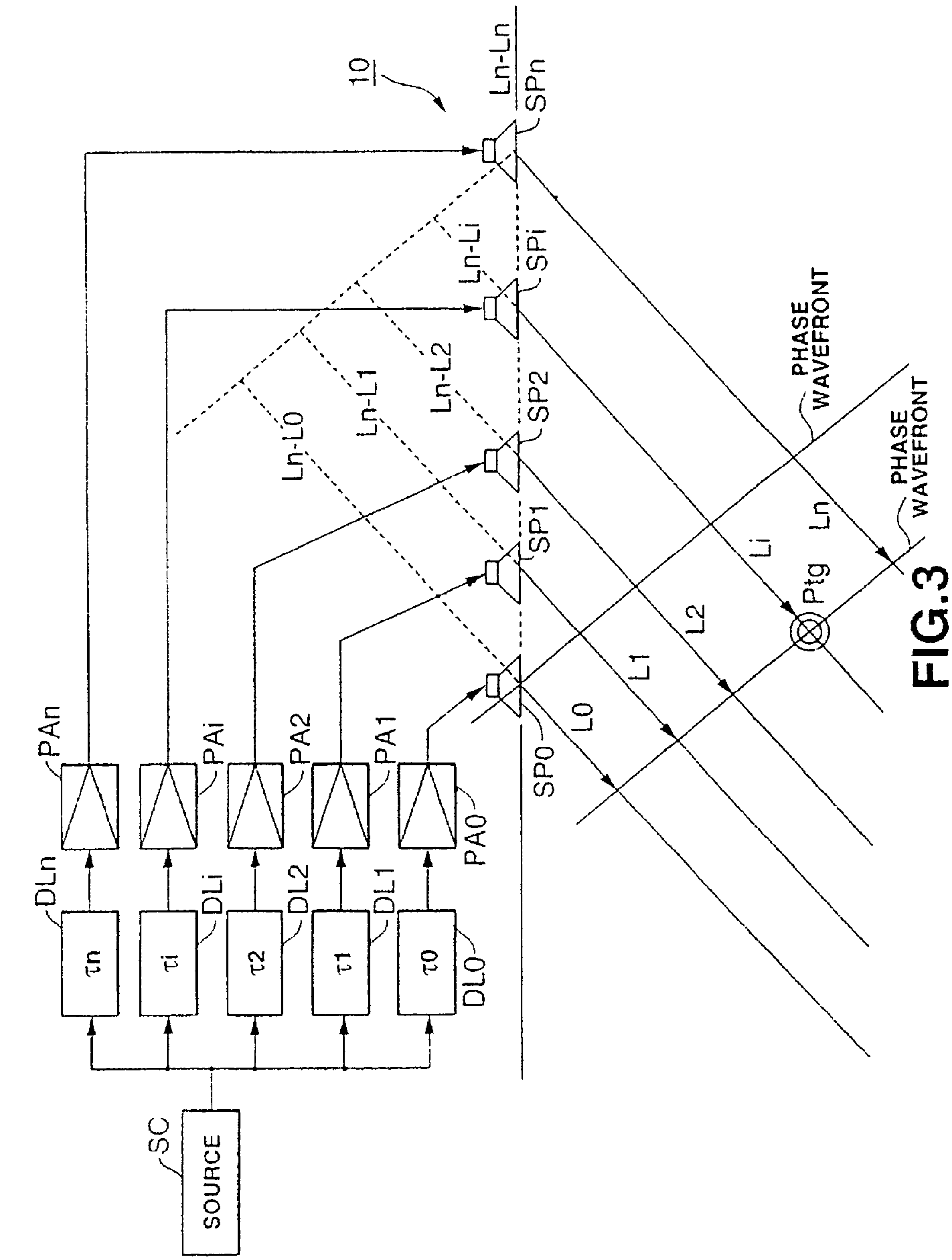
FIG.3 (PRIOR ART)
FIG. 3 is a schematic block diagram showing another example in which a sound field is formed by the speakers included in the speaker array.
Figure 5:
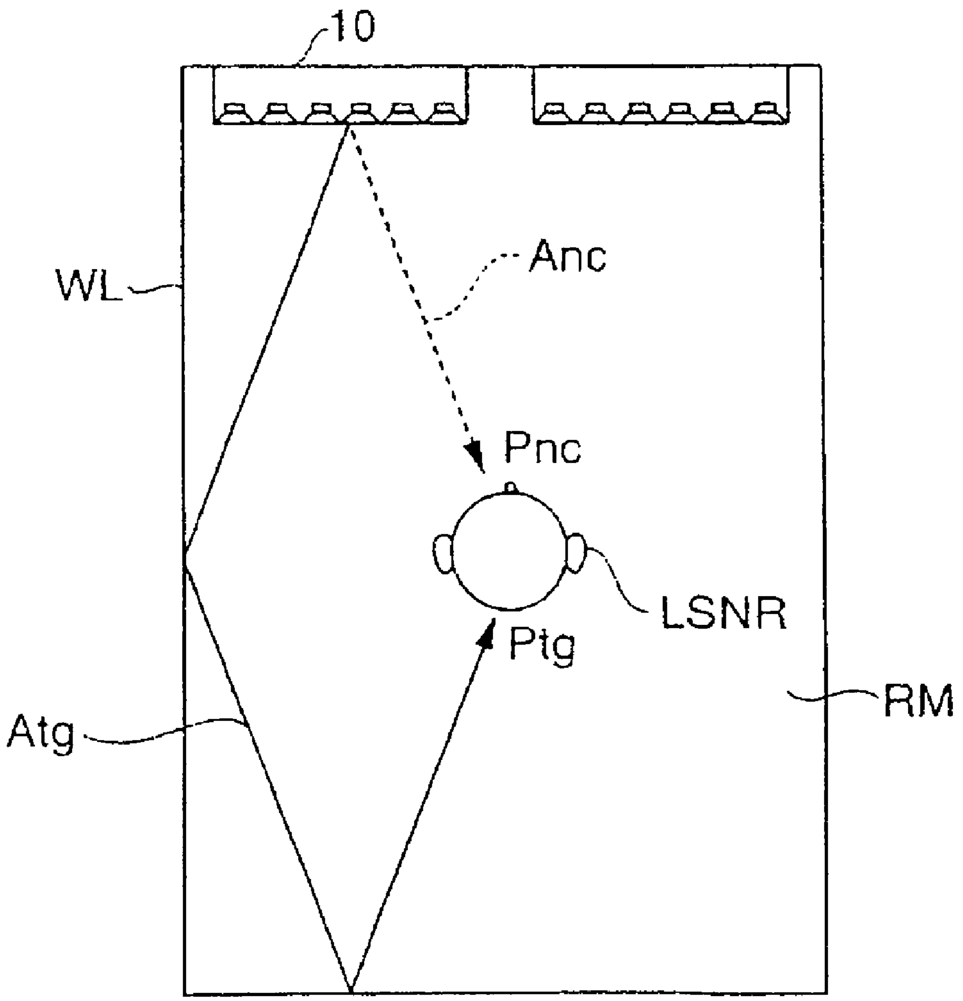
FIG.5 (PRIOR ART)
FIG. 5 is a plan view showing the reflection of sound delivered from a speaker array disposed in a room which is an acoustically closed space.

In the case of the speaker arrays shown in FIGS. 1 to 3, the sound field is an open space. Generally, however, the sound field is a space or a space RM acoustically closed by walls WL as shown in FIG. 5. In this room RM, sound Atg delivered from the speaker array 10 can be focused at a listener LSNR after reflected at the wall WL surrounding the listener LSNR by selecting the focus Ptg or an intended direction of the speaker array 10.

In this case, although the speaker array 10 is located before the listener LSNR, the sound will be heard from behind. In this case, however, the sound Atg from behind has to be so set that it will be heard as loudly as possible because it is an intended one and sound Anc has to be so set that it will be heard as low as possible because it is an "oozing sound" not intended.

Figure 6:
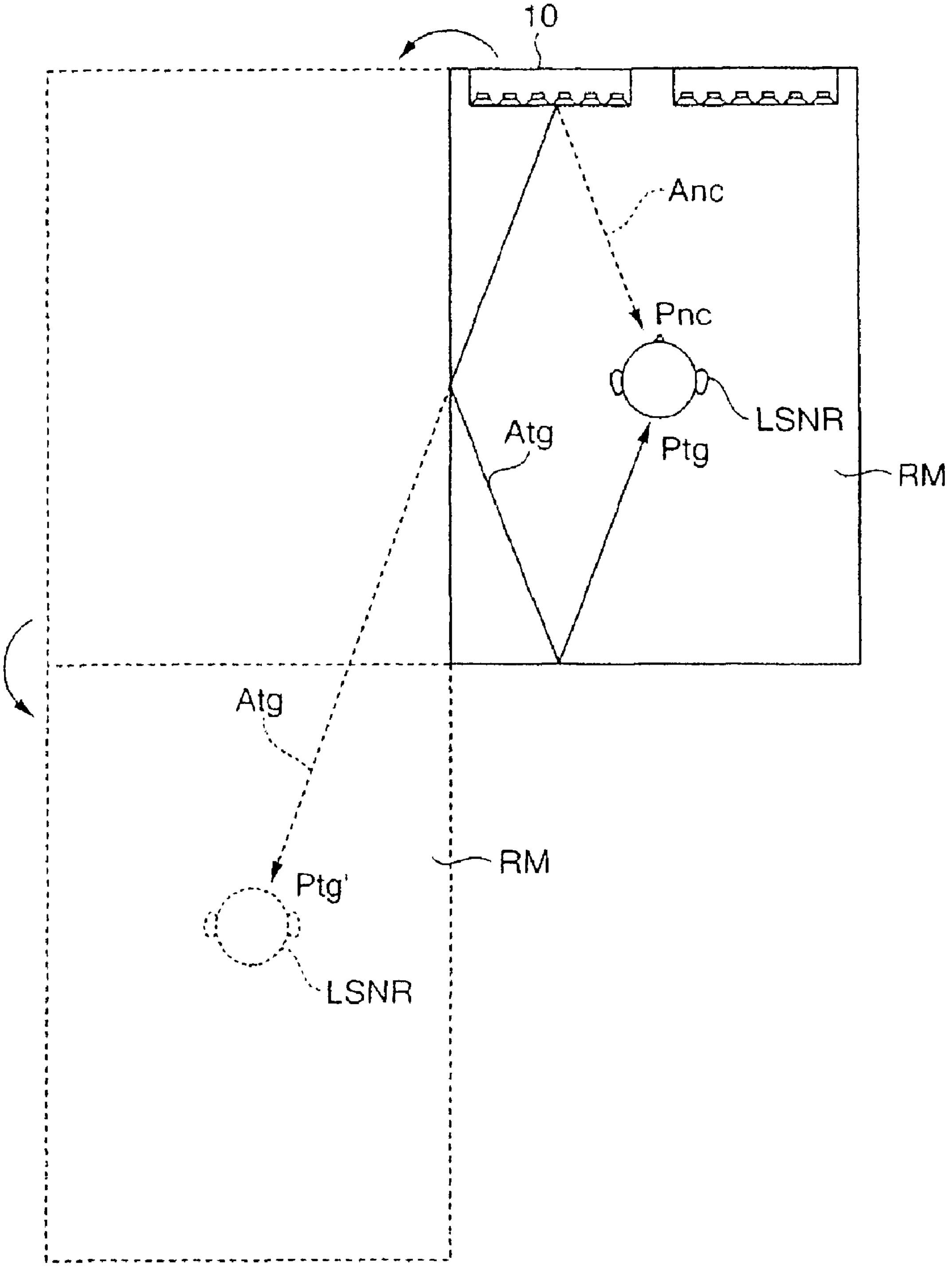
FIG.6 (PRIOR ART)
FIG. 6 is also a plan view showing the position of a virtual image of a listener, formed due to sound reflection in the acoustically closed space.

On this account, the virtual image of the entire room is taken in consideration in connection with the number of times of reflections of the sound Atg as shown in FIG. 6. Since the virtual image may be considered to be equivalent to an open space as shown in FIG. 2 or 3, a virtual position Ptg' corresponding to the sound pressure increasing point Ptg is set in the position of a virtual image of the listener LSNR and the focus or intended direction of the speaker array 10 is set in the position of the Ptg' point. Also, the sound pressure decreasing point Pnc is set in the position of the actual listener LSNR.

With the above-mentioned construction of the audio signal processing system, virtual speakers can be disposed behind and laterally of a multi-channel stereo system to enable surround stereo reproduction without having to dispose the speakers behind and laterally of the listener LSNR.

Note that for implementation of such a focusing type virtual speaker system, the focus Ptg may be set on the wall WL or in any other places, not in the position of the listener LSNR depending upon the purpose, application, source's contents, etc. Also, the sound localization, name, the direction from which the sound is heard, cannot technically be assessed based on the sound pressure difference alone, but it will be important in this system to increase the sound pressure.

Next, how to decrease the sound pressure at the point Pnc will be explained.

Figure 7A:
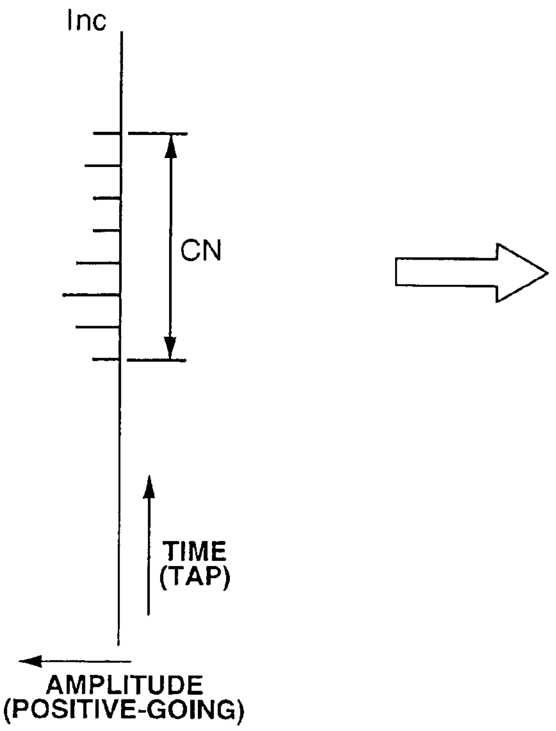
FIGS. 7A to 7C show changing of the frequency response due to change of the amplitude of a pulse in the digital filter.

When the listener LSNR is positioned in the room RM (closed space) as shown in FIGS. 5 and 6, the sound pressure increasing point Ptg will also be so positioned that delay times depending upon the filter factors CF0 to CFn will be determined. When the listener LSNR is positioned, the sound pressure decreasing point Pnc will also be positioned and a position where a pulse of the space synthesis impulse response Inc at the sound pressure decreasing point Pnc appears as shown in FIG. 7A as well will also be determined (the space synthesis impulse response in FIG. 7A is the same as the space synthesis impulse response Inc shown in FIG. 4). Also, when the amplitudes A0 to An of pulses from the digital filters DL0 to DLn are changed, the controllable sample width (number of pulses) will be a sample width CN as shown in FIG. 7A.

Figure 7B:
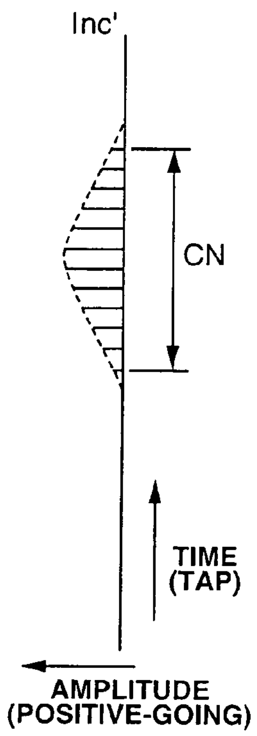
Figure 7C:
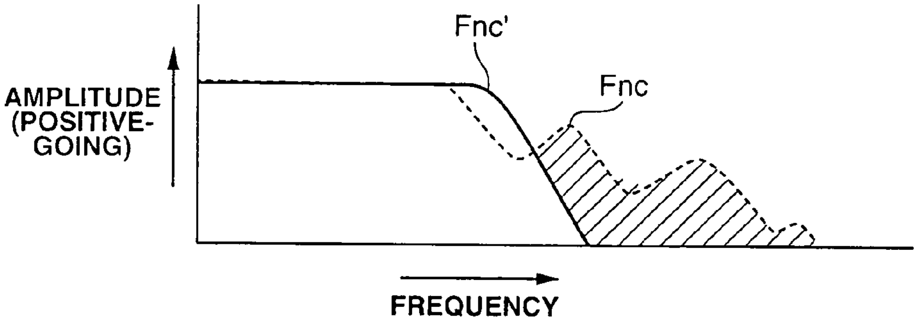

Therefore, by changing the amplitudes A0 to An, the pulse (in the sample width CN) shown in FIG. 7A can be changed to a pulse (space synthesis impulse response) Inc' whose level distribution is as shown in FIG. 7B for example and the frequency response be changed from the frequency response Fnc to a frequency response Fnc' as shown in FIG. 7C.

That is to say, the sound pressure at the sound pressure decreasing point Pnc will be decreased for only a hatched portion of the frequency band as shown in FIG. 7C. Therefore, in the example shown in FIG. 5, the oozing sound Anc from front will be smaller than the intended sound Atg from behind and thus the sound from behind will be heard better.

It is important that even when the pulse is changed to the space synthesis impulse response Inc' by changing the amplitudes A0 to An, the space synthesis impulse response Itg and frequency response Ftg at the sound pressure increasing point Ptg will be changed only for the amplitudes thus changed and a uniform frequency characteristic can be maintained. Therefore, according to the present invention, the amplitudes A0 to An are changed to provide the frequency response Fnc' at the sound pressure decreasing point Pnc.

Next, how to determine the space synthesis impulse response Inc' will be explained.

There will be explained the method of determining the necessary space synthesis impulse response Inc' on the basis of the space synthesis impulse response Inc.

Generally, to form a low-pass filter from an FIR digital filter, there have been proposed some design methods using a window function, such as Hamming, Hanning, Kaiser, Blackman, etc. It is well known that the frequency response of a filter designed by any of these methods features a relatively sharp cut-off characteristic. In this case, since only the CN sample can have the pulse width controlled with the amplitudes A0 to An, the low-pass filter will be designed herein using the window function. When the shape of the window function and sample count CN are determined, the cut-off frequency of the frequency response Fnc' will also be determined.

Figure 8:
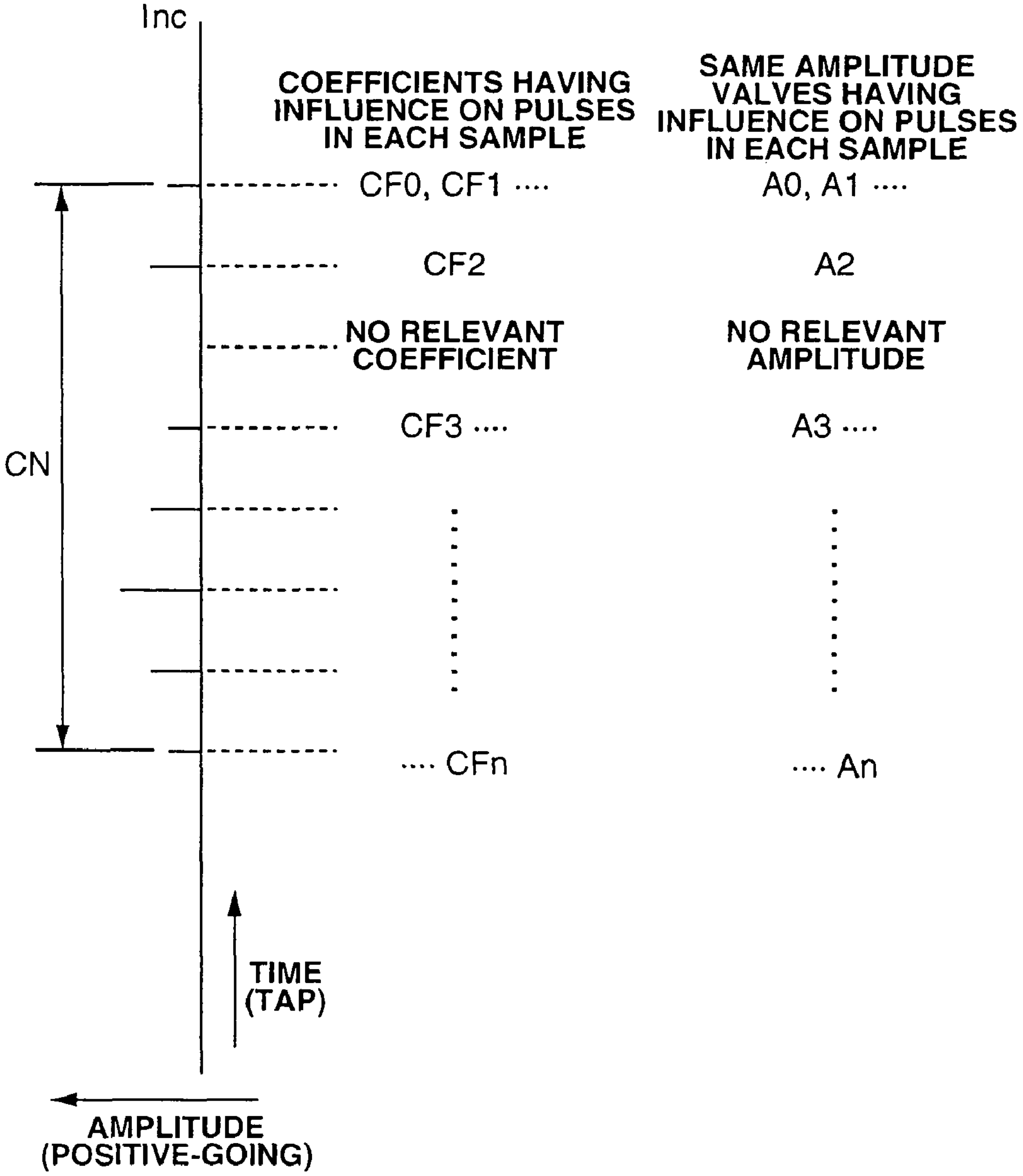
FIG. 8 explains identification and back calculation of amplitudes A0 to An by specifying a "factor having had an influence on samples in a CN width" of a space synthesis impulse response Inc in advance.

Specific values of the amplitudes A0 to An are determined based on the window function and sample count CN. For example, the amplitudes A0 to An can be identified and back-calculated by specifying a "factor having had an influence on samples in a CN width" of the space synthesis impulse response Inc in advance as shown in FIG. 8. In this case, since the plurality of factors will have an influence on one pulse in the space synthesis impulse response Inc as the case may be, and if the number of corresponding factors (=number of speakers SP0 to SPn) is smaller, there will exist no relevant factor as shown by way of example in FIG. 8.

Note that the window width of the window function should preferably be nearly equal to the distribution window of the sample count CN. Also, if the plurality of factors has any influence on one pulse in the space synthesis impulse response Inc, it suffices to distribute the plurality of factors. In this method of factor distribution, it is preferred that any one of the amplitudes, which has less influence on the space synthesis impulse response Itg while having a large influence on the space synthesis impulse response Inc' should preferentially be adjusted, which however is not defined herein.

Figure 9:
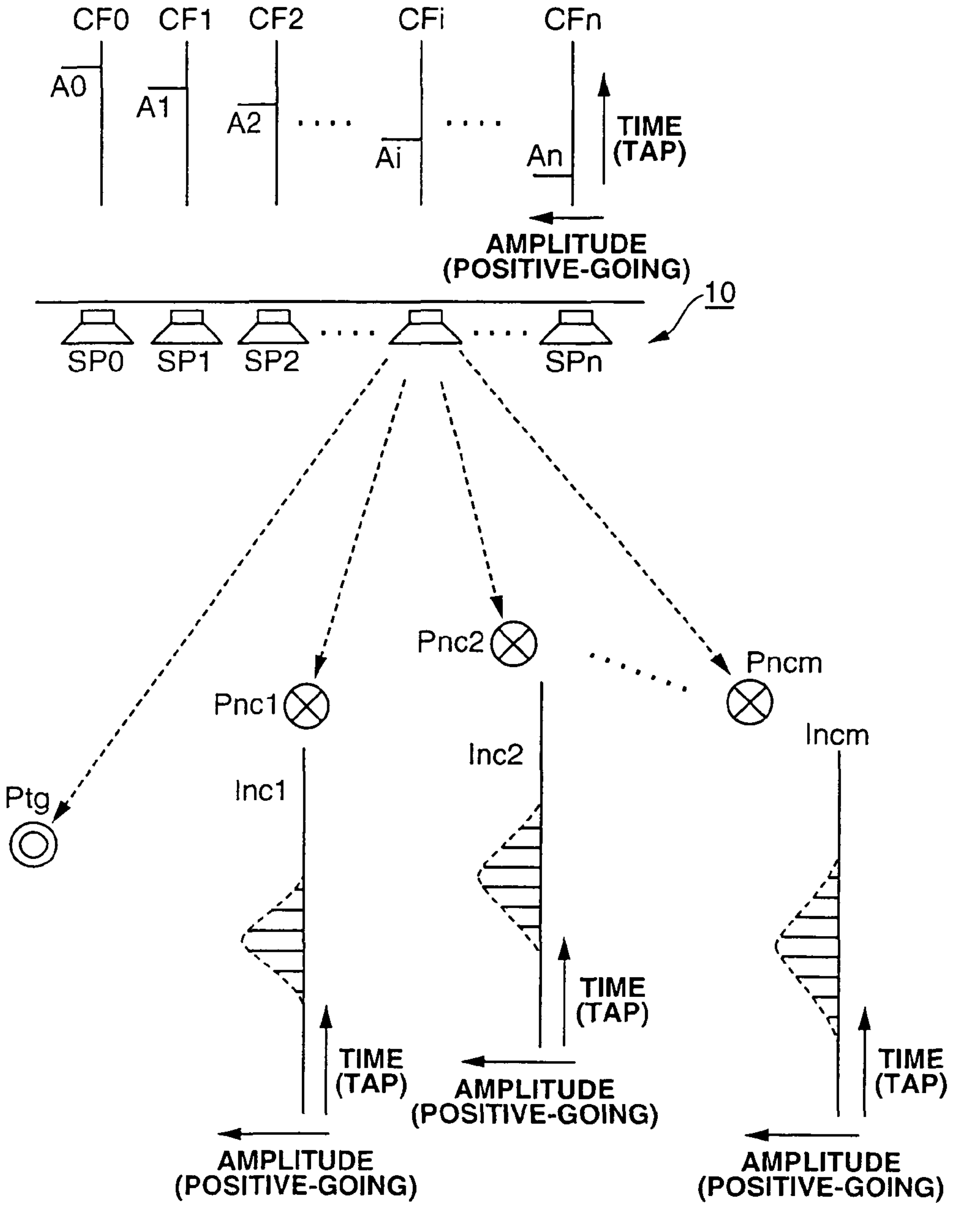
FIG. 9 explains setting of a plurality of points Pnc1 to Pncm as the sound pressure decreasing points Pnc and determination of amplitudes A0 to An which meets the points Pnc1 to Pncm.

Further, a plurality of points Pnc1 to Pncm may be set as the sound pressure decreasing points Pnc as shown in FIG. 9 and the amplitudes A0 to An which meets the points Pnc1 to Pncm be determined using simultaneous equations. If the simultaneous equations are not met or if the amplitudes A0 to An having an influence on specific pulses of the space synthesis impulse response Inc do not meet the points Pcn1 to Pncm as shown in FIG. 8, the amplitudes A0 to An may be so determined by the method of least squares or the like that they will depict a curve of a target window function.

Also, the filter factors CF0 to CF2 may be made to correspond to the point Pnc1, filter factors CF3 to CF5 be made to correspond to the point Pnc2, filter factors CF6 to CF8 be made to correspond to the point Pnc3, . . . , or the filter factors CF0 to CFn and points Pnc1 to Pncm may be set in a nested relation with each other.

Further, by considering the sampling frequency, number of speaker units and spatial arrangement, it is possible to design an audio signal processing system in which factors having an influence on each pulse of the space synthesis impulse response Inc exist as stochastically many as possible. Also, since the space synthesis impulse response Inc is made through a space in which sounds delivered from the speakers SP0 to SPn form together a continuous series, any specific one of the factors will not technically have an influence on each pulse as in discretization during the measurement. For the convenience of calculation, however, the system is explained herein as if only one factor would have an influence on each pulse, which will not give rise to any practical problem as having been proved by the experiments made by the Inventors of the present invention.

Next, the present invention will be described in detail concerning some preferred embodiments thereof with reference to the accompanying drawings.

Figure 10:
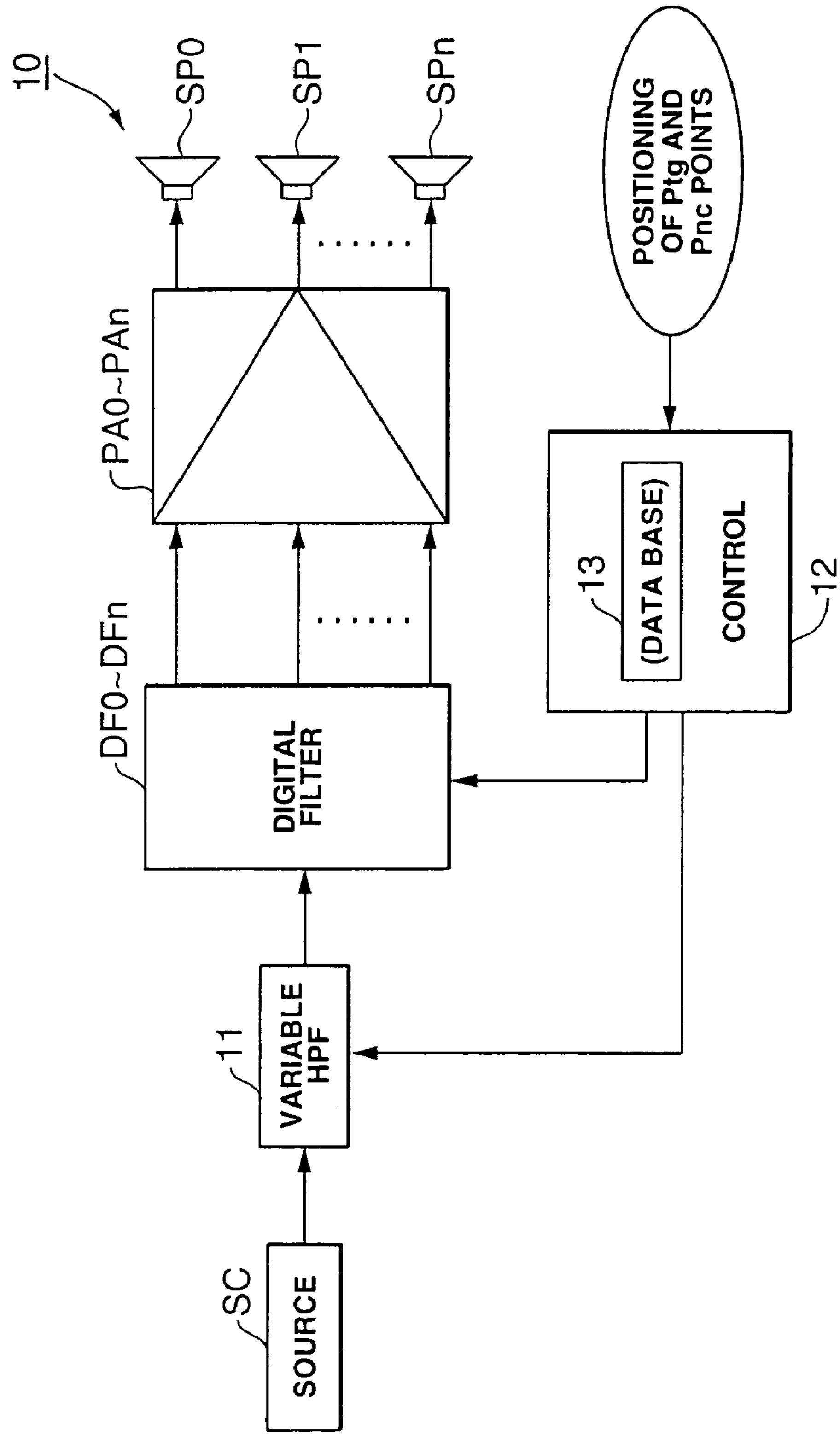
FIG. 10 is a schematic block diagram of a first embodiment of the audio signal processing system according to the present invention.

The first embodiment is an application of the present invention to an audio signal processing system. FIG. 10 shows an example of the audio signal processing system. In FIG. 10, an audio signal line for one channel is illustrated. That is, a digital audio signal is supplied from a source SC to FIR digital filters DF0 to DFn via a variable high-pass filter 11, and outputs from the FIR digital filters DF0 to DFn are supplied to speakers SP0 to SPn via power amplifiers PA0 to PAn, respectively.

In this case, since the cut-off frequency of the frequency response Fnc' can be estimated from the sample width CN of the controllable space synthesis impulse response Inc, that of the variable high-pass filter 11 is controlled in conjunction with the cut-off frequency of the frequency response Fnc'. Under this control, only an audio signal having a frequency in a band in which the frequency response Ftg is predominant over the frequency response Fnc' is permitted to pass by. In a case as shown in FIG. 11, for example, when the low-frequency portion of the frequency response Fnc' has the same level as that of the frequency response Ftg, the effective band of the source is controlled and that low-pass portion is not used, whereby it is possible to output only a band which is effective when the sound is heard from behind.

Also, the digital filters DF0 to DFn are included in the aforementioned delay circuits DL0 to DLn, respectively. Further, in the power amplifiers PA0 to PAn, the supplied digital audio signal has the power thereof amplified after subjected to D-A (digital to analog) conversion or to D-class amplification, and is then supplied to the speakers SP0 to SPn.

Figure 11:
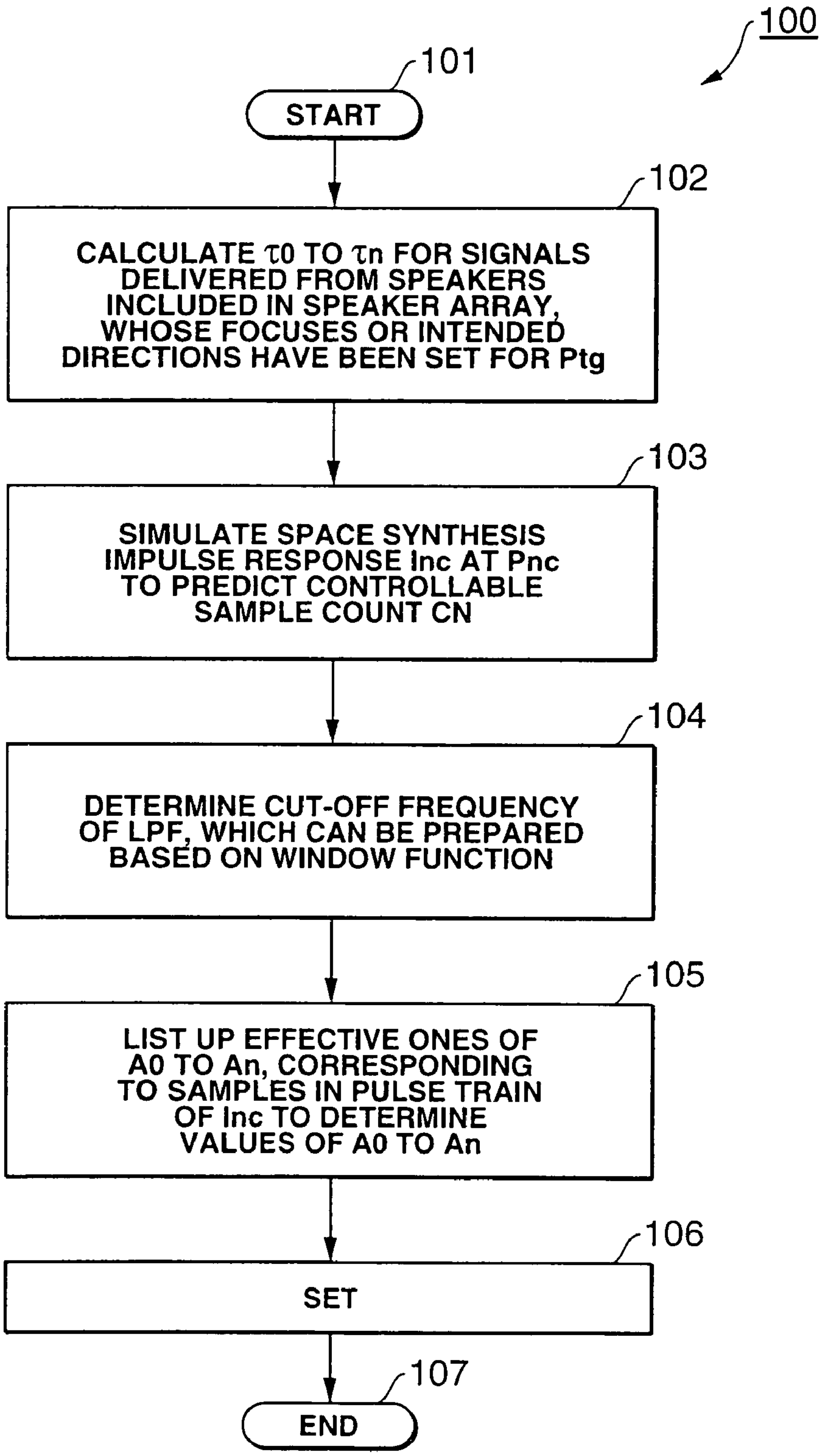
FIG. 11 shows a flow of operations made in audio signal processing in the audio signal processing system.

In this case, in a control circuit 12, a routine 100 shown in FIG. 11 for example is executed and the characteristics of the high-pass filter 11 and digital filters DF0 to DFn are set as above. That is, when supplied with the points Ptg and Pnc, the control circuit 12 starts its routine 100 at step 101. Then in step 102, the control circuit 12 calculates the delay times τ0 to τn to be given in the digital filters DF0 to DFn. Next in step 103, the control circuit 12 simulates the space synthesis impulse response Inc at the sound pressure decreasing point Pnc to predict a controllable sample count CN.

Then in step 104, the control circuit 12 calculates a low-pass filter cut-off frequency which can be prepared based on a window function. In step 105, the control circuit 12 lists up effective ones of the amplitudes A0 to An corresponding to the samples, respectively, in the pulse train of the space synthesis impulse response Inc and determines the amplitudes A0 to An. Then in step 106, the control circuit 12 sets the cut-off frequency of the variable high-pass filter 11 and delay times τ0 to τn to be given in the digital filters DF0 to DFn on the basis of the results of the above operations, and then exits the routine 100 in step S107.

With the above operations, the control circuit 12 can determine the sound pressure increasing and decreasing points Ptg and Pnc.

Next, the present invention will be described in detail concerning the second embodiment thereof.

Figure 12:
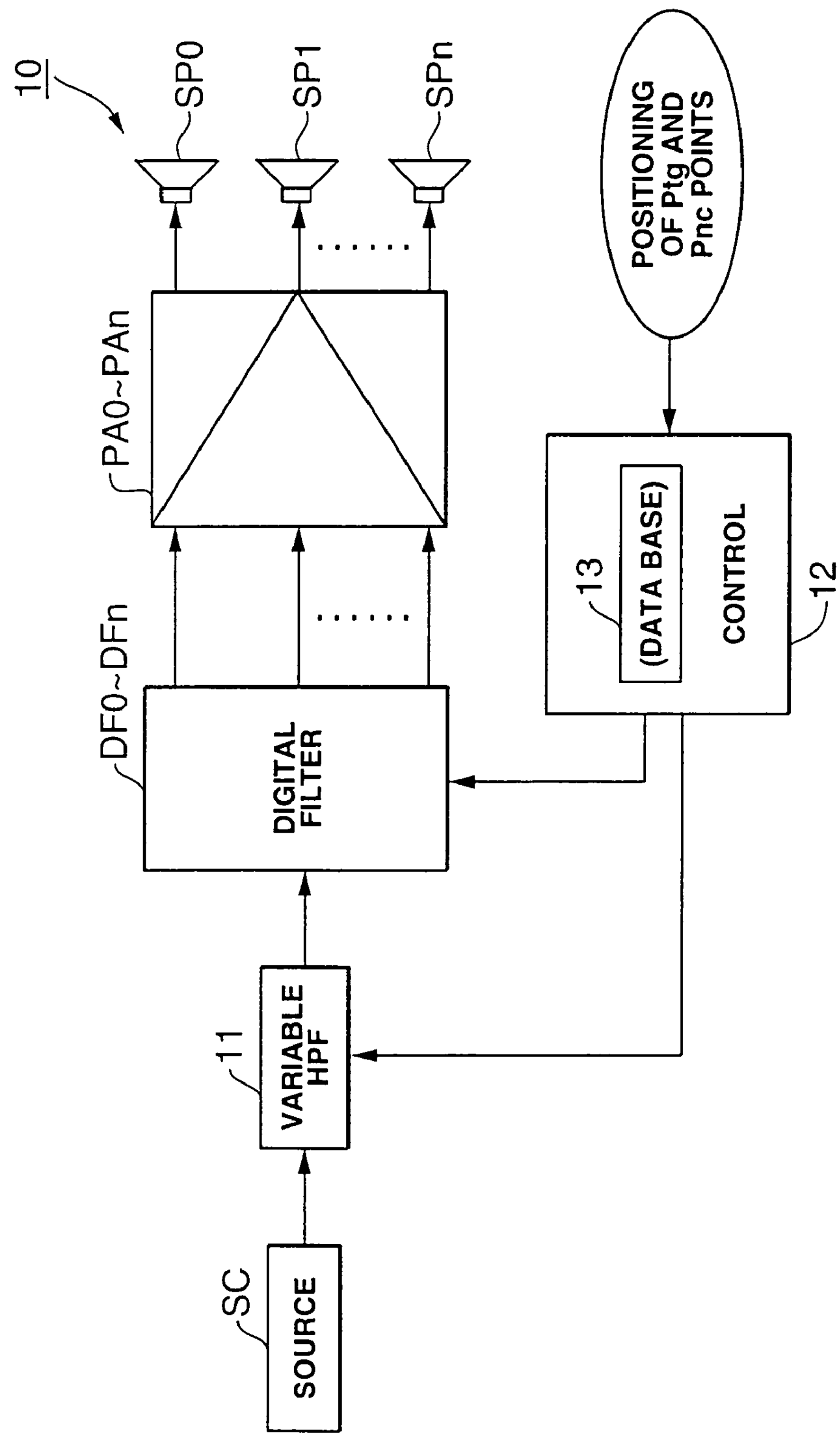
FIG. 12 is a schematic block diagram of a second embodiment of the audio signal processing system according to the present invention.

In the system shown in FIG. 12, data on a cut-off frequency of the variable high-pass filter 11 and delay times τ0 to τn to be given in the digital filters DF0 to DFn are calculated for a plurality of points Ptg and Pnc, and the data is stored as a data base in a storage unit 13 of the control circuit 12. When the data for the points Ptg and Pnc are supplied to the storage unit 12 while the reproduction system is in operation, corresponding data is taken out of the storage unit 13 and there are set a cut-off frequency of the variable high-pass filter 11 and delay times τ0 to τn to be given in the digital filters DF0 to DFn.

Next, the present invention will be described in detail concerning the third embodiment thereof.

Figure 13:
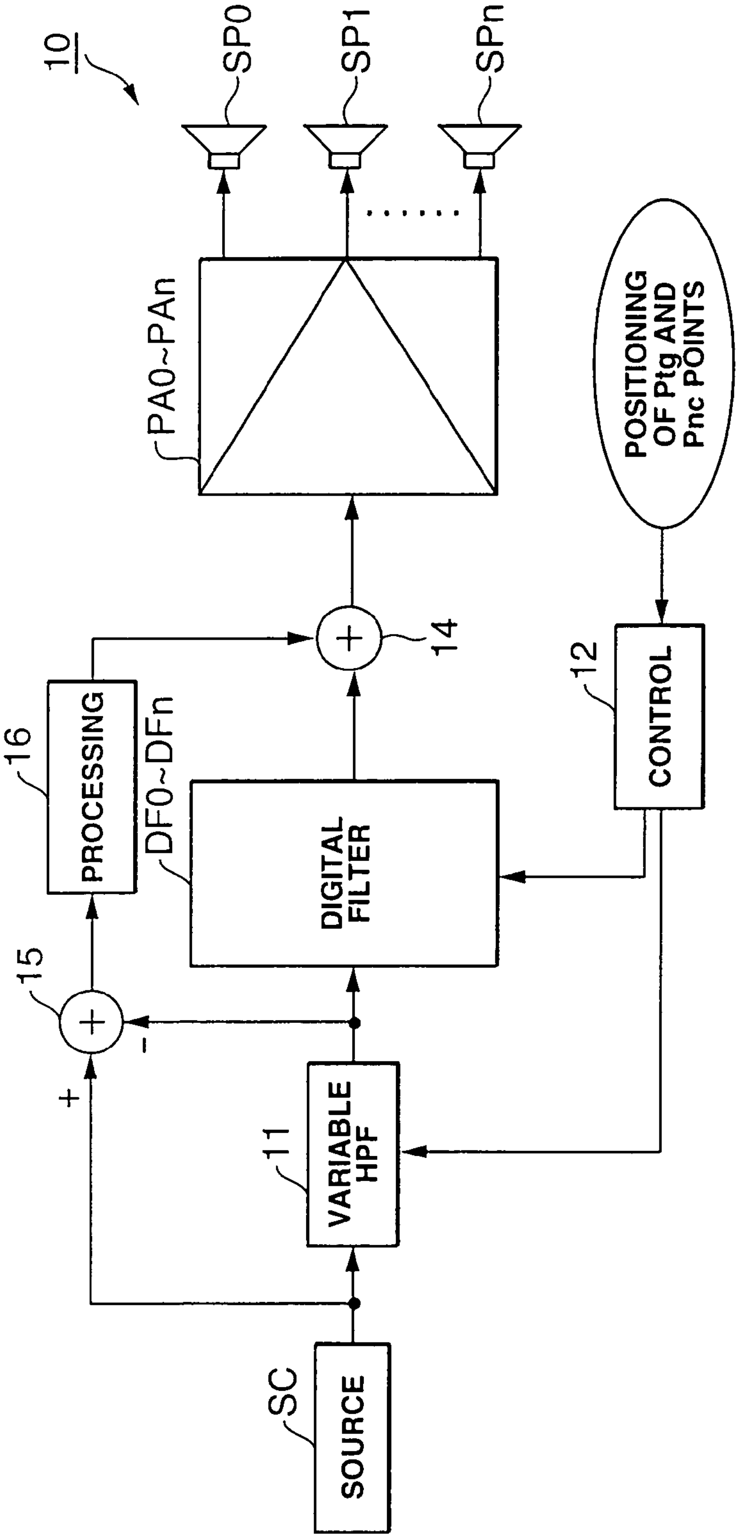
FIG. 13 is also a schematic block diagram of a third embodiment of the audio signal processing system according to the present invention.

In the system shown in FIG. 13, a digital audio signal supplied from the source SC is processed by the variable high-pass filter 11 and digital filters DF0 to DFn as in the aforementioned first embodiment, for example. The signal thus processed is supplied to the speakers SP0 to SPn via a digital addition circuit 14 and power amplifiers PA0 to PAn.

Further, the digital audio signal supplied from the source SC and output from the variable high-pass filter 11 are supplied to a digital subtraction circuit 15 which will then provide digital audio signal components of middle- and low-frequencies (the flat portion shown in FIG. 7C). These digital audio signals of middle- and low-frequencies are supplied to the digital addition circuit 14 via a processing circuit 16.

Therefore, an oozing sound at the sound pressure decreasing point Pnc can be controlled correspondingly to the processing made in the processing circuit 16.

Next, the present invention will be described in detail concerning the fourth embodiment thereof.

Figure 14:
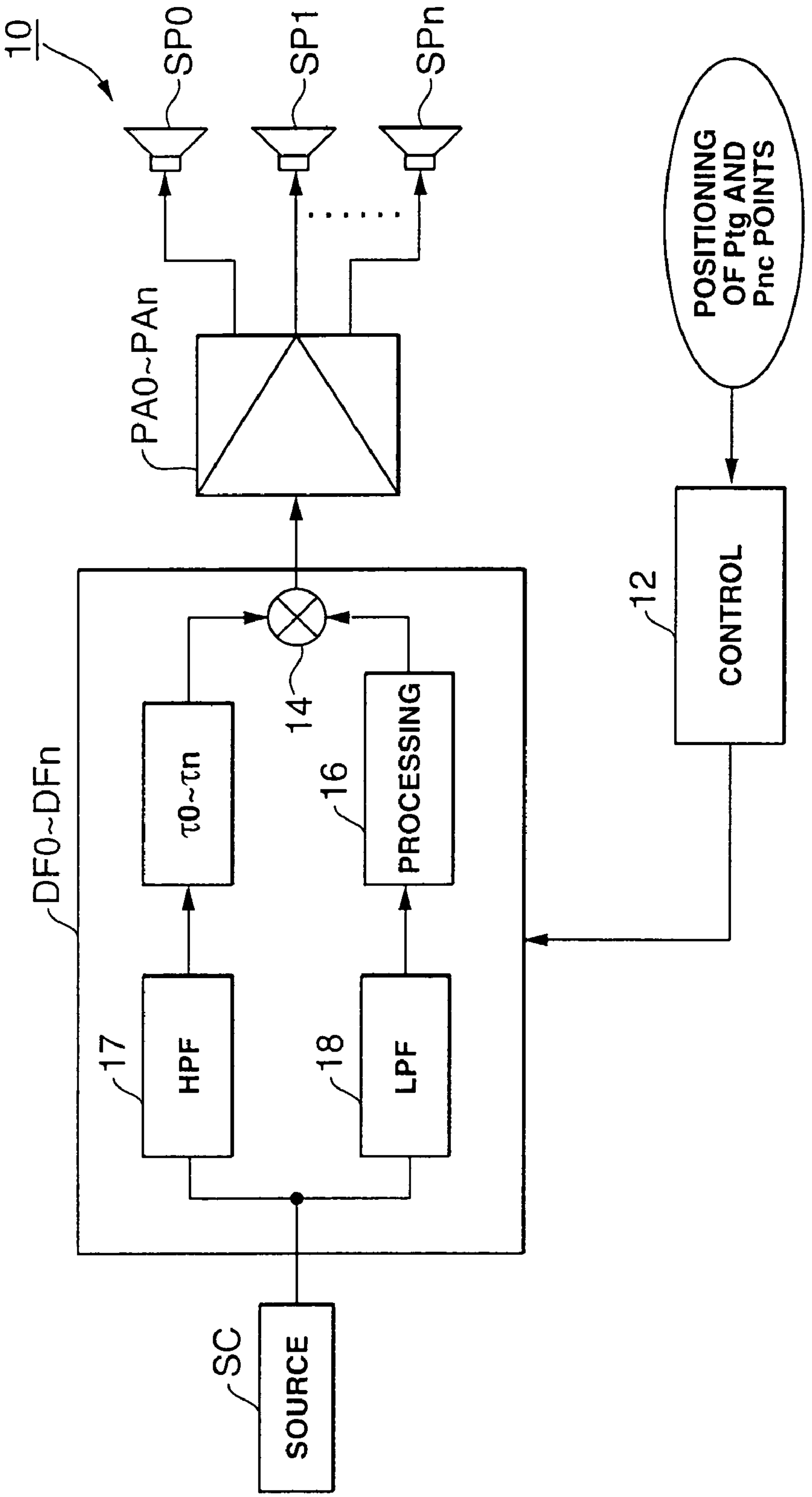
FIG. 14 is a schematic block diagram of a fourth embodiment of the audio signal processing system according to the present invention.

FIG. 14 schematically illustrates an equivalent circuit for the operations by the FIR (finite impulse response) digital filters DF0 to DFn. As shown, the source SC supplies a digital audio signal to the original FIR digital filters DF0 to DFn via a fixed digital high-pass filter 17, and outputs from the digital filters DF0 to DFn are supplied to the digital addition circuit 14. Further, the digital audio signal from the source SC is supplied to the processing circuit 16 via a digital low-pass filter 18.

Therefore, in case the processing circuit 16 may be formed from digital filters, the operation thereof can be done by the digital filters DF0 to DFn.

Next, the present invention will be described in detail concerning the fifth embodiment thereof.

Figure 15:
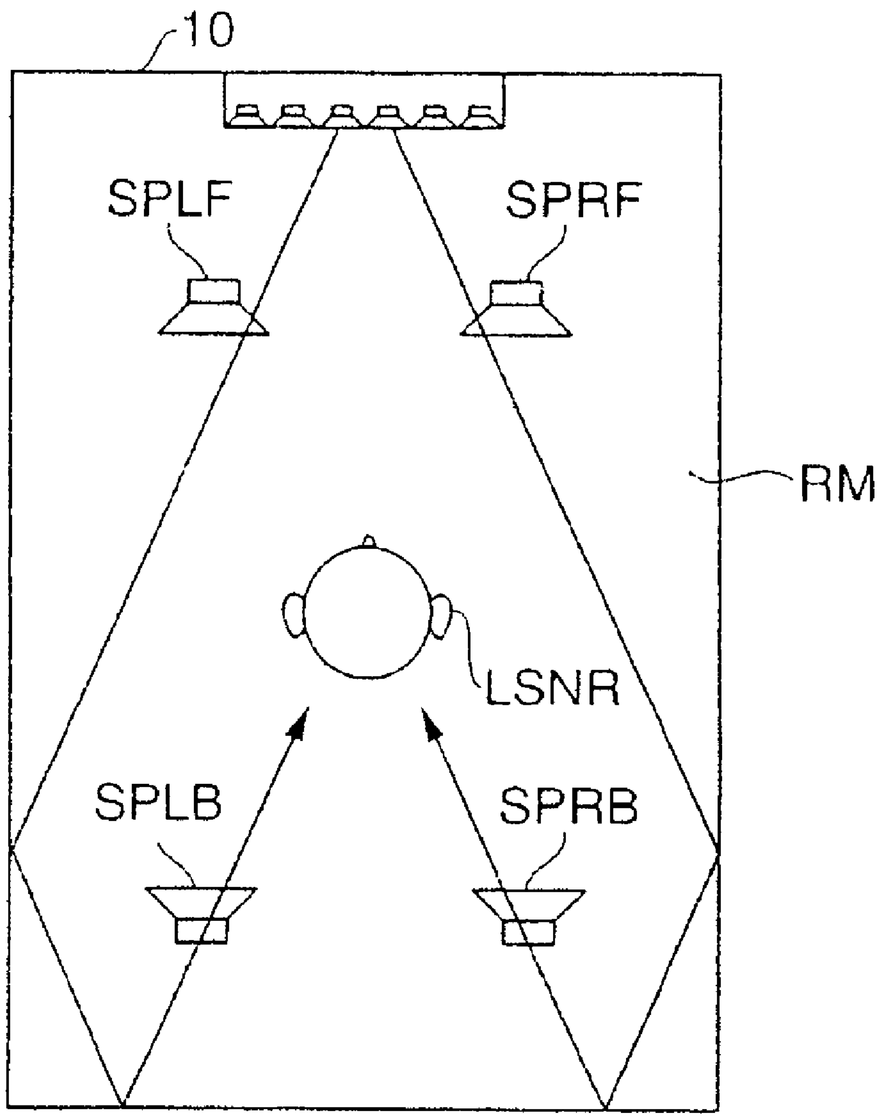
FIG.15 (PRIOR ART)
FIG. 15 is a plan view of a 4-channel surround stereo sound field formed by one speaker array.
Figure 16:
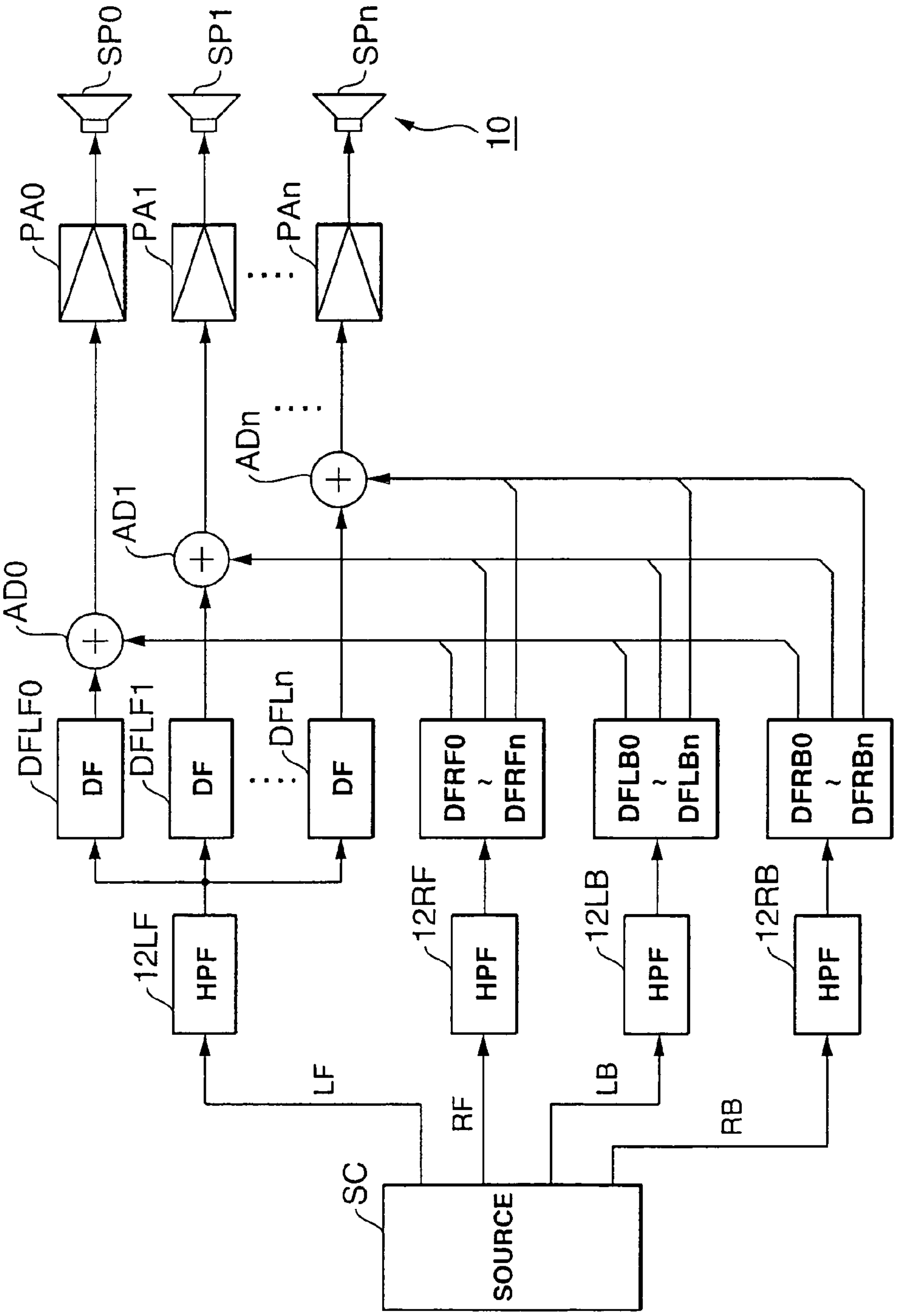
FIG. 16 is a schematic block diagram of an audio signal processing system in which a 4-channel surround stereo sound field formed by one speaker array.

FIGS. 15 and 16 show how one speaker array 10 implements virtual speakers $SP_{LF}$, $SP_{RF}$, $SP_{LB}$ and $SP_{RB}$ at left front, right front, left back and right back of the listener LSNR to form a 4-channel surround stereo sound field.

As shown in FIG. 15, the speaker array 10 is disposed in front of the listener NSNR in the room RM. Also, as shown in FIG. 16, the left front channel is so configured that a left-front digital audio signal $D_{LF}$ will be taken from the source SC and supplied to FIR digital filters $DF_{LF0}$ to $DF_{LFn}$ via a variable high-pass filter $\mathbf{12}_{LF}$. Outputs from the FIR digital filters are supplied to the speakers SP0 to SPn via digital addition circuits AD0 to ADn and power amplifiers PA0 to PAn.

Also, the right front channel is so configured that a right-front digital audio signal $D_{RF}$ will be taken from the source SC and supplied to the FIR digital filters $DF_{RF0}$ to $DF_{RFn}$ via the variable high-pass filter $12_{RF}$. Outputs from the digital filters are supplied to the speakers SP0 to SPn via the digital addition circuits AD0 to ADn and power amplifiers PA0 to PAn.

Further, the left and right back channels are also configured similarly to the left front and right front channels. In FIG. 16, these channels are indicated with reference symbols LB and RB just in place of those LF and RF for the left and right front channels, and hence they will not be described herein.

The value of each channel is set as having been described with reference to FIGS. 10 and 14. For the left and right front channels, virtual speakers $SP_{LF}$ and $SP_{RF}$ are implemented by the system having been described with reference to FIG. 1, for example. For the left and right back channels, virtual speakers $SP_{LB}$ and $SP_{RB}$ are implemented by the system having been described with reference to FIG. 5, for example. Therefore, these virtual speakers $SP_{LF}$ to $SP_{RB}$ form a 4-channel surround stereo sound field.

Since each of the aforementioned systems can implement a surround multi-channel stereo system by one speaker array 10, no wide space is required for installation of so many speakers which would conventionally be necessary. Also, since the number of channels can be increased just by using additional digital filters, no additional speakers are required.

In the aforementioned embodiments of the present invention, the window function is used as a design principle for the space synthesis impulse response Inc' to provide a relatively sharp low-lass filter characteristic. However, a desired low-pass filter characteristic may be attained by adjusting the filter-factor amplitude with any other function than the window function.

Also in the aforementioned embodiments, the filter factors are set as pulse trains all having positive-going amplitudes, so that all the space-synthesis impulse responses are pulse trains having positive-going amplitudes. However, the sound pressure decreasing point Pnc may have the characteristic thereof defined by setting the pulse amplitude in each filter factor as positive- or negative-going while maintaining the delay characteristic to focus the sounds at the sound pressure increasing point Ptg.

Further in the aforementioned embodiments, an impulse is basically used as a delaying element, which however is intended for simplicity of the explanation. The same effect can be assured by adopting taps of a plurality of samples having certain frequency responses as the basic delaying elements. For example, the delaying element may basically be a pseudo pulse train which assures an effect of pseudo over-sampling. In this case, a negative component in the direction of amplitude is also included in the factors, but it can be said that such a negative element is similar in effect to the impulse. It should be noted that the pseudo pulse train will be described in detail below.

Moreover in the aforementioned embodiments, the delay given to the digital audio signal is represented by a filter factor. However, this representation may also be applied in a system including delay units and digital filters. Further, a combination of, or a plurality of combinations of, amplitudes A0 to An may be set for at least one of the sound pressure increasing and decreasing points Ptg and Pnc. Also, in case the speaker array 10 is so arranged for a fixed application as in implementation of virtual rear speakers as shown in FIG. 6 for example that general reflection points, listening points, etc. can be conceived, the filter factors may be fixed ones CF0 to CFn corresponding to sound pressure increasing and decreasing points Ptg and Pnc that can be preconceived.

Furthermore in the aforementioned embodiments, the amplitudes A0 to An of the filter factors corresponding to the space-synthesis impulse response Inc' may be determined by simulation with parameters such as influence of the air-caused attenuation of the sound wave during propagation, phase change due to reflection by a reflecting object, etc. Also, each of such parameters may be measured by an appropriate measuring means to determine more appropriate amplitudes A0 to An for more accurate simulation.

Also, in the aforementioned embodiments, the speaker array 10 includes the speakers SP0 to SPn disposed in a horizontal line. However, the speakers SP0 to SPn may be disposed in a plane or in a depth direction. Also, the speakers SP0 to SPn may not always be disposed orderly. Moreover, each of the aforementioned embodiments is of a focusing type system. However, the directive type system can make a similar process.

Next, delaying operation using a pseudo pulse will be explained.

In the aforementioned embodiments of the present invention, a delay time based on a unit delay time defined with a system sampling frequency is set for each digital filter for the simplicity of explanation. However, the delay time should more preferably be set with a higher precision.

The pulse train (impulse response) which implements the delay time with a substantially higher time resolution than the unit delay time defined with the system sampling frequency will be referred to as "pseudo pulse train" hereinafter.

First, there will be explained how the data base is prepared.

In the following explanation, there will be used symbols defined below:

Fs System sampling frequency

Nov Numerical value by which a sampling period 1/Fs is divided for a time resolution. Also, a multiple of an over-sampling frequency in relation to a sampling frequency Fs.

Nps Number of pulses for approximate representation of a pulse shape on the time base of the over-sampling period 1/(Fs×Nov) by a plurality of pulses whose sampling frequency is Fs. Also, a number of pulses in a pseudo pulse train and also a degree of a digital filter which implements a desired delay.

EXAMPLES

Fs=48 kHz, Nov=8, Nps=16

First, for pre-processing for sound reproduction by the speaker array 10, a pseudo pulse train is prepared as above and registered in a data base.

Figures 17A, 17B, 17C, 17D:
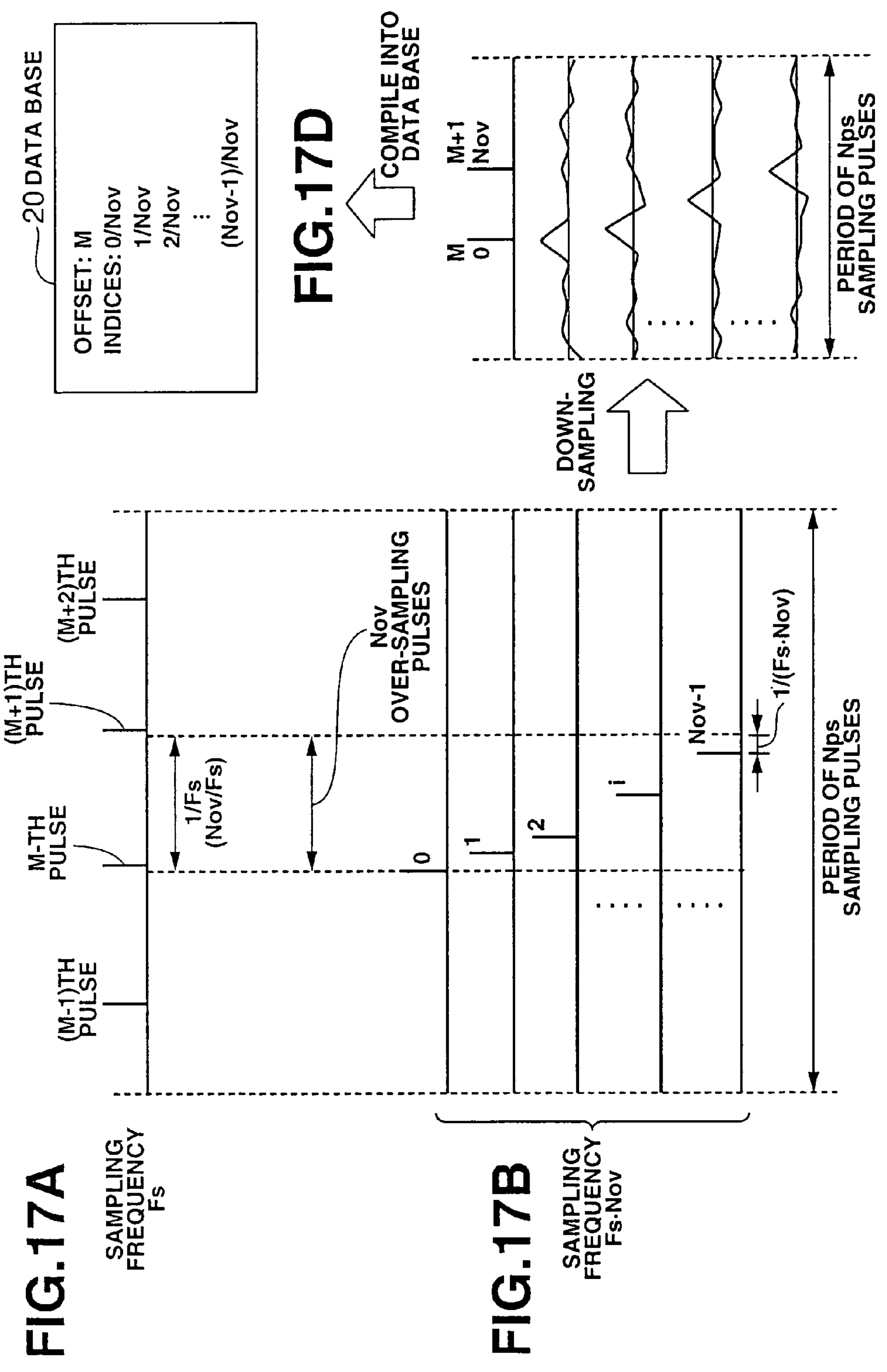
FIGS. 17A to 17D explains a pseudo pulse train formed in the pre-processing for reproduction by the speaker array.

That is, a data base is prepared as will be described below:

(1) An over-sampling multiple Nov. and a number of pulses Nps in a pseudo pulse train are assumed based on a necessary time resolution. Here will be explained an increase, by Nov times, of a time resolution from an M-th pulse to a next (M+1)th pulse as shown in FIGS. 17A and 17B. Also, a time duration of Nps pulses is set on the time base of the sampling period 1/Fs.

(2) Since the over-sampling multiple is Nov, Nov over-sampling pulses will be included in a period from the M-th pulse to (M+1)th pulse as shown in FIG. 17B. By setting the following:

$$m=0, 1, 2, \ldots, Nov-1$$

the over-sampling pulse will take a position (M+m/Nov) on the time base of the sampling period 1/Fs. Otherwise, the over-sampling pulse will take a position (M+Nov×m) on the time base of the over-sampling period 1/F(Fs×Nov).

(3) The over-sampling pulse in (2) is down-sampled from the sampling frequency Fs×Nov to a sampling frequency Fs to determine a pseudo pulse train as shown in FIG. 17C.

In this case, each series in (2) may be transformed by the FFT into a frequency axis and the frequency except for only effective values down to the sampling frequency Fs is transformed by the inverse FFT into a time base, for example. Also, since the down-sampling may be done in various manners including designing of an anti-aliasing filter, no down-sampling technique will be described herein.

(4) Thereafter, the pseudo pulse train (series of the number of pulses Nps) determined in (3) above is virtually dealt with as a pulse in a time position (M+m/Nov) on the time base of the sampling period 1/Fs. In this case, on the time base of the sampling period 1/Fs, the value M is an integral number and the value n/Nov is a decimal number.

(5) The value M is regarded as offset information and the value m/Nov is as index information, these pieces of information and a table corresponding to data on the waveform of the pseudo pulse train determined in (4) above are registered into a data base 20 as shown in FIG. 17D.

FIGS. 18 to 21 show waveforms, gain characteristics and phase characteristics of the pseudo pulse train formed as in (1) to (4) above. It should be noted that FIGS. 18 to 21 show such waveforms, gain characteristics and phase characteristics when Nov=8, Nps=16 and m=0 to 7.

Figure 18A:
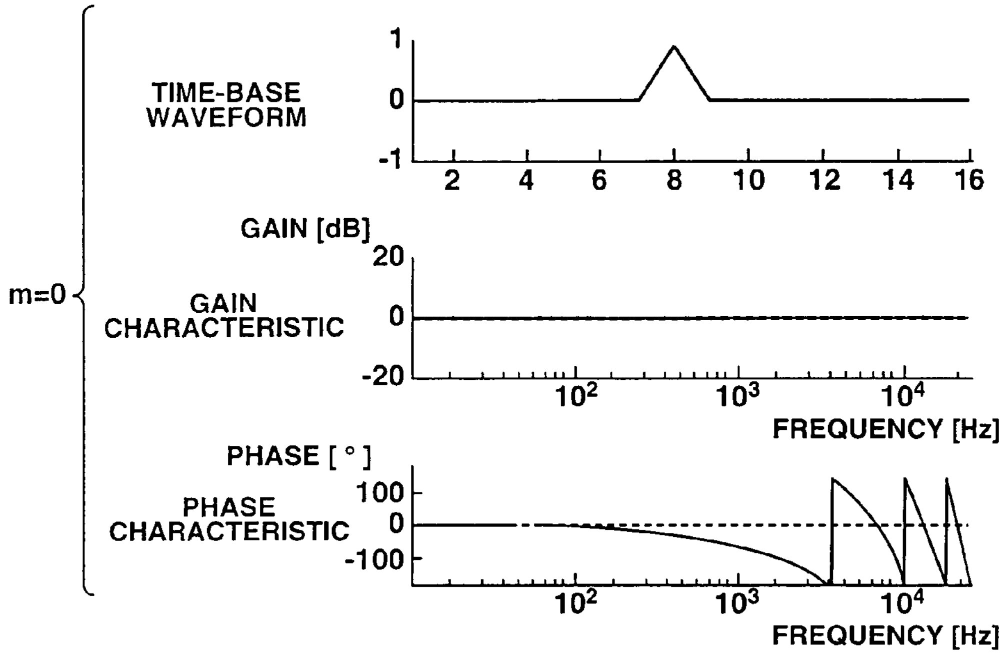
FIGS. 18A and 18B show waveforms, gain characteristics and phase characteristics of a pseudo pulse train used in the present invention.
Figure 18B:
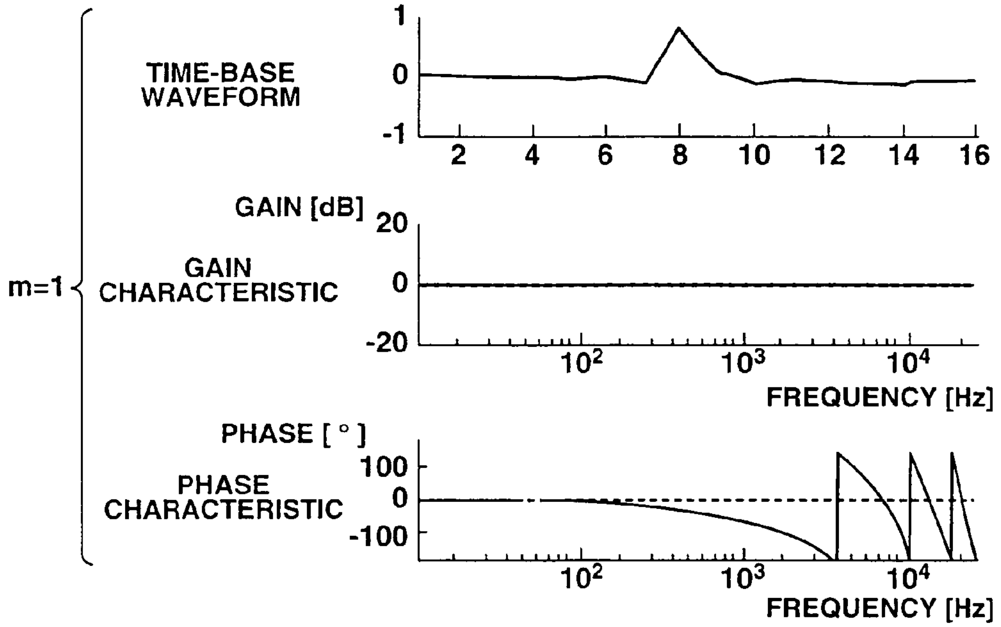
Figure 19A:
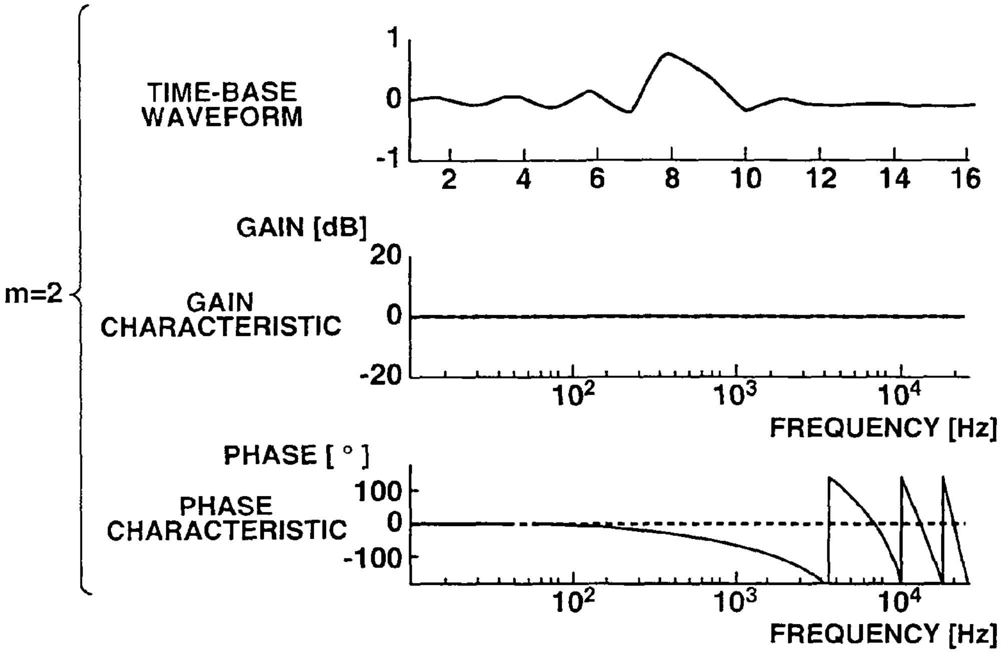
FIGS. 19A and 19B show waveforms, gain characteristics and phase characteristics of a pseudo pulse train used in the present invention.
Figure 19B:
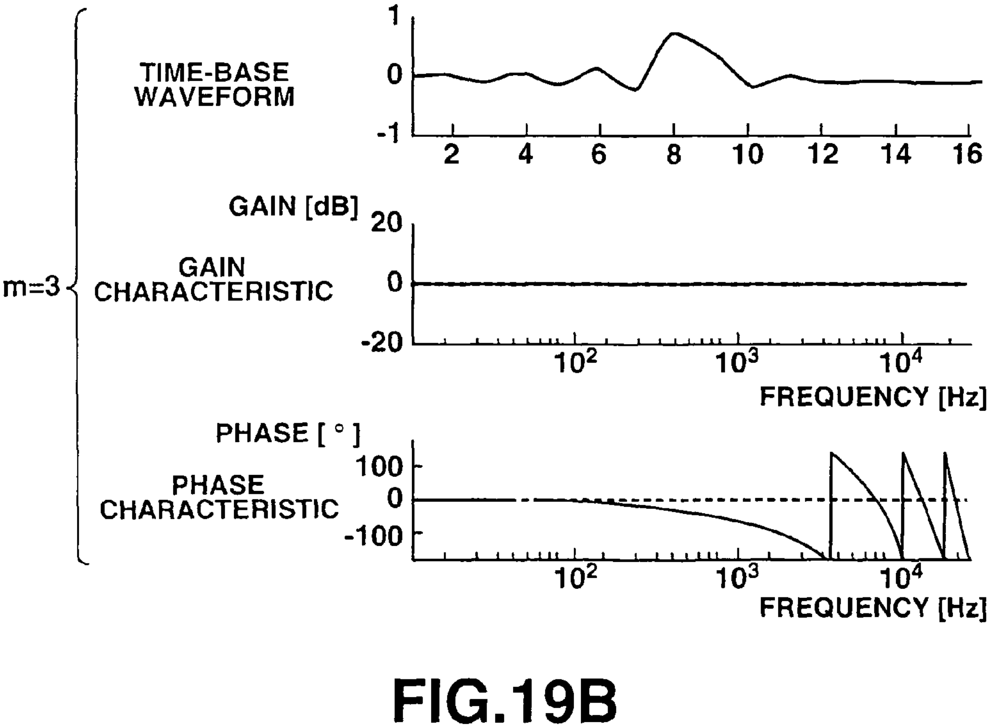
Figure 20A:
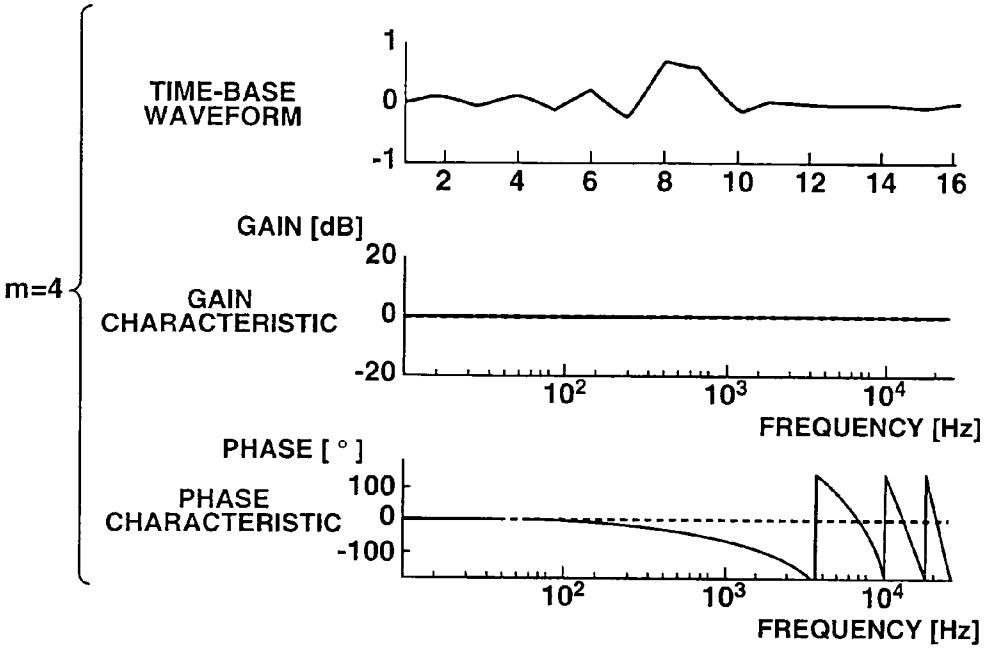
FIGS. 20A and 20B show waveforms, gain characteristics and phase characteristics of a pseudo pulse train used in the present invention.
Figure 20B:
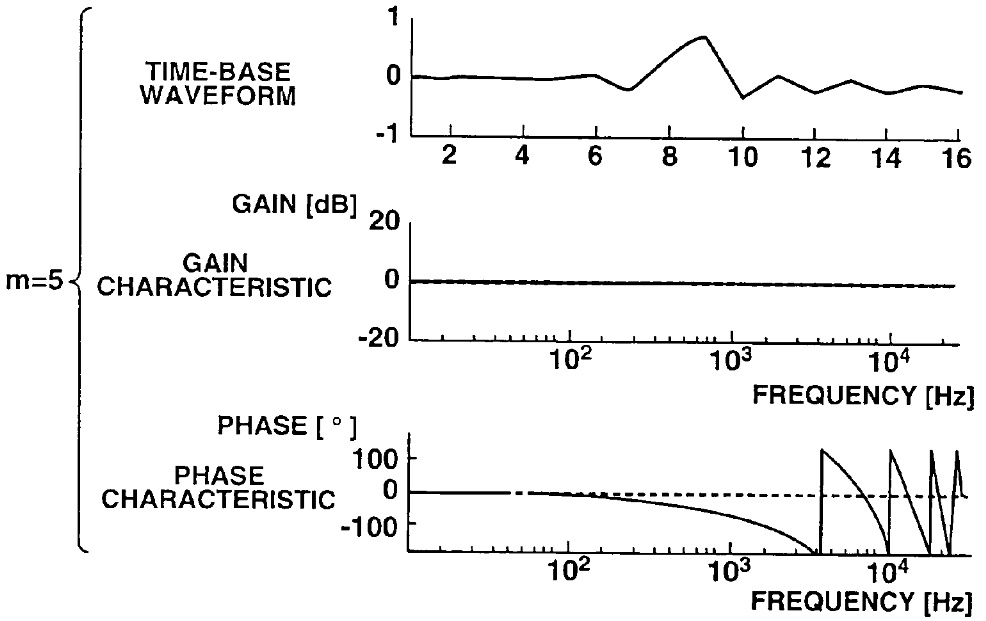
Figure 21A:
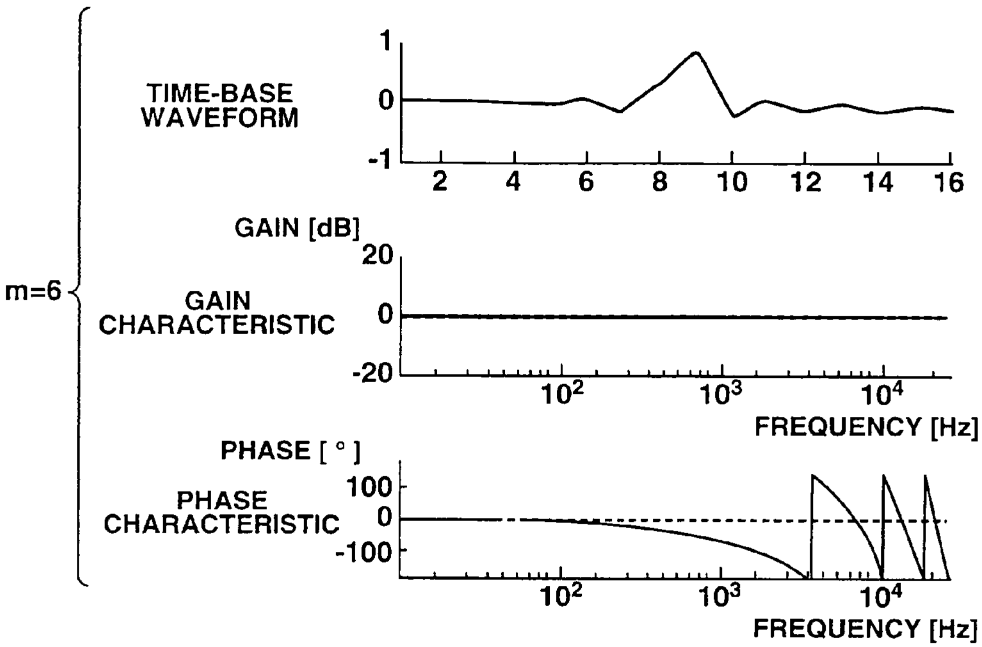
FIGS. 21A and 21B show waveforms, gain characteristics and phase characteristics of a pseudo pulse train used in the present invention.
Figure 21B:
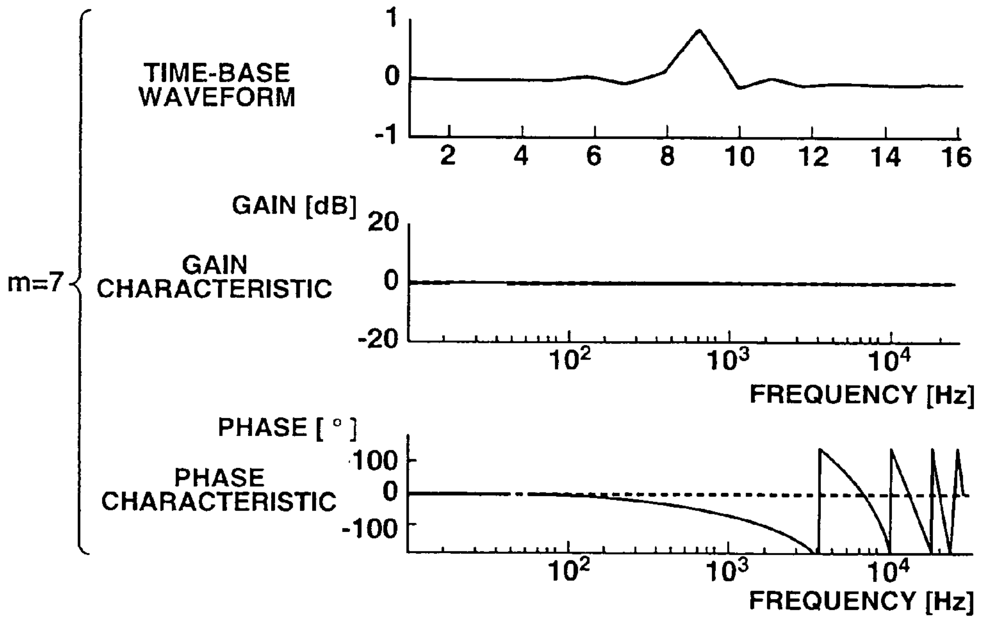

In case m=0 as in FIG. 18A for example, the value of the time-base waveform is 1.0 at the eighth sample and 0.0 at the other samples. So, FIG. 18A shows a transfer characteristic which simply results in a delay by eight sampling periods (8/Fs). As the value m increases, the peak position of the time-base waveform gradually shifts to the ninth sample, which will be known from FIGS. 18 to 21. At this time, although the frequency gain characteristic is almost flat, the frequency phase characteristic provides a larger phase delay as the value m increases, as will be known from FIGS. 18 to 21. That is, a delay with the time resolution of 1/(Fs×Nov) is implemented by filtering with the sampling frequency Fs.

The necessary pre-processing for the sound reproduction has been described in the foregoing. The sound reproduction will be described herebelow using the information in the data base 20.

The data base 20 prepared as in the aforementioned data base preparing process is used for the sound reproduction by the speaker array 10 as will be described below:

That is, sound is reproduced by the speaker array 10 as will be described below:

(11) Digital filters are provided in series with the delay circuits DL0 to DLn. The digital filters are used to provide delay times, and their factors are set as will be described later.

(12) First, delay times τ0 to τn corresponding to a position (or intended direction) of the focus Ptg are determined and multiplied by the sampling frequency Fs to transform the delay times τ0 to τn into a "delayed sample count" on the frequency axis of the sampling frequency Fs. Each of the delay times 96 0 to τn may be a value having a fraction which cannot be represented with the resolution of the delay circuits DL0 to DLn. That is, the delay times τ0 to τn and delayed sample count may not be any integral multiple of the resolutions of the delay circuits DL0 to DLn.

(13) Next, the delayed sample count determined in (12) above is divided into an integral part and decimal part (fractional part), and the integral part is set as a delay time which is to be given in each of the delay circuits DL0 to DLn.

(14) Then, it is judged to which of the index information m/Nov cumulated in the data base 20 the decimal part of the delayed sample count determined in (12) above is approximate. Namely, it is judged to which of 0/Nov, 1/Nov, 2/Nov, . . . , (Nov−1)/Nov the decimal part is approximate. It should be noted that if the decimal part is determined to be approximate to Nov/Nov=1.0, the integral part is increased by one and the decimal part is determined to be approximate to 0/Nov.

(15) Waveform data on a corresponding pseudo pulse train is taken out of the data base 20 on the basis of the result of the judgment in (14) above, and set as a filter factor for the FIR digital filter in (11) above.

With the above operations, the total delay time given to an audio signal through the delay circuits DL0 to DLn and digital filter will include delay times τ0 to τn as determined in (12) above. Therefore, in the focusing type system, the sound delivered from the speakers SP0 to SPn will be focused at the position of the focus Ptg and a sound image is definitely localized. Also, in the directive type system, the intended direction will pass through the position Ptg and thus a sound image will also be definitely localized.

Also, since the sounds from the speakers SP0 to SPn will be more accurately in phase at the focus Ptg while the phase will vary widely in positions other than the focus Ptg, the sound pressure can be decreased more at the positions other than the focus Ptg. Thus, the sound image can be localized more definitely.

Strictly speaking, the time resolution is not increased in all bands but with some down-sampling technique, it will be difficult to attain any high time resolution in high-frequency bands. Taking account of a difference between the sound pressure at the focus Ptg (or intended direction) and that at the positions other than the focus Ptg (or non-intended direction), however, it will be clear that the sound can effectively be more directive in almost all frequency bands in practice.

Next, the present invention will be described in detail concerning the sixth embodiment thereof.

Figure 22:
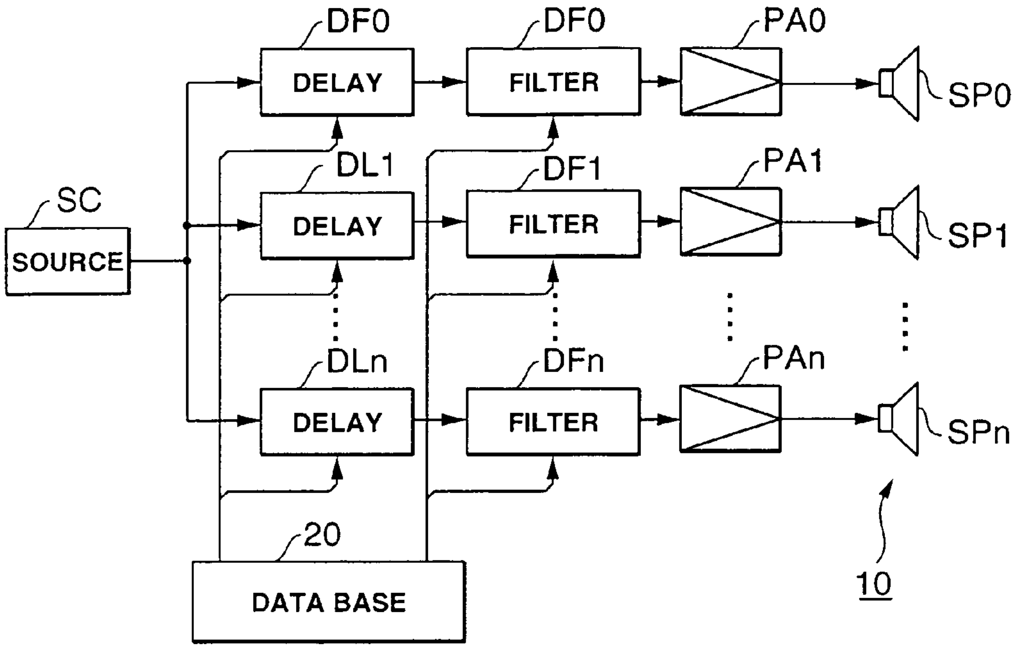
FIG. 22 is a schematic block diagram of a sixth embodiment of the audio signal processing system according to the present invention.

FIG. 22 shows an example of the sound reproduction apparatus according to the present invention. As shown, a digital audio signal is supplied from the source SC sequentially to the digital delay circuits DL0 to DLn and FIR digital filters DF0 to DFn, and outputs from the filters are supplied to the power amplifiers PA0 to PAn, respectively.

In this embodiment, the delay time given in each of the delay circuits DL0 to DLn is the integral part as in (13) above. Also, by setting the factors of the FIR digital filters DF0 to DFn as in (15) above, the filters can be made to provide a time delay corresponding to the decimal part as in (13) above. Further, in each of the power amplifiers PA0 to PAn, the supplied digital audio signal is subjected to D-A conversion and power amplification or D-class amplification in this order, and then supplied to a corresponding one of the speakers SP0 to SPn.

Moreover, the data base 20 is prepared. As in the aforementioned steps (1) to (5) for preparation of the data base, a data base 20 is prepared which includes a table of correspondence between the offset information M and index information m/Nov and the waveform data on the pseudo pulse train determined as in (4) above. The data base 20 is searched based on the decimal part as in (13) above, and the result of the search is set for the FIR digital filters DF0 to DFn. Also, the integral part as in (13) is as the delay time to be given in the delay circuits DL0 to DLn.

With the above-mentioned construction of the sound reproduction system according to the present invention, even if the delay times τ0 to τn required for focusing the sound at the point Ptg (or for passing the intended direction by the point Ptg) exceed the resolution of the delay circuits DL0 to DLn, the delay time given in each of the FIR digital filters DF0 to DFn implements the decimal part exceeding the resolution.

Therefore, in the case of a focusing type system, the sound delivered from the speakers SP0 to SPn is focused at the focus Ptg and the sound image is definitely localized. Also, in the case of a directive type system, the intended direction passes by the position of the point Ptg and the sound image will also be localized definitely.

Next, the present invention will be described in detail concerning the seventh embodiment thereof.

Figure 23:
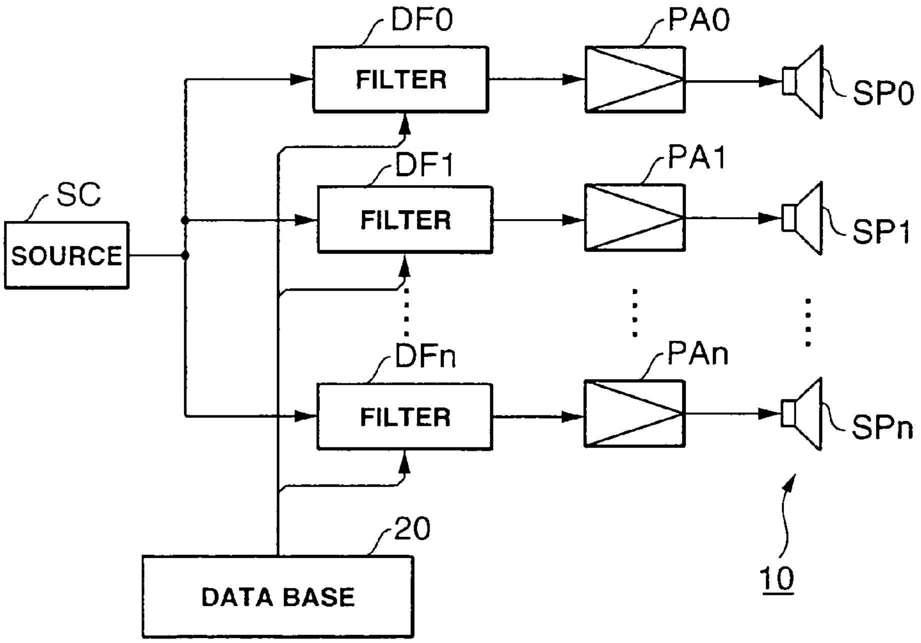
FIG. 23 is a schematic block diagram of a seventh embodiment of the audio signal processing system according to the present invention.

FIG. 23 shows a sound reproduction apparatus according to the present invention. As will be seen, the FIR digital filters DF0 to DFn also function as the delay circuits DL0 to DLn. In this embodiment, the data base 20 is searched based on the index information m/Nov. The offset information M is set for each of the FIR digital filters DF0 to DFn according to the result of the search and a delay time to be given in each of the delay circuits DL0 to DLn is thus set for each of the filters, and waveform data on the index information m/Nov is set.

Therefore, also in this sound reproduction apparatus, since the focus Ptg or intended direction is appropriately set, the sound image can be distinctly localized.

Next, the present invention will be described in detail concerning the eighth embodiment thereof.

Figure 24:
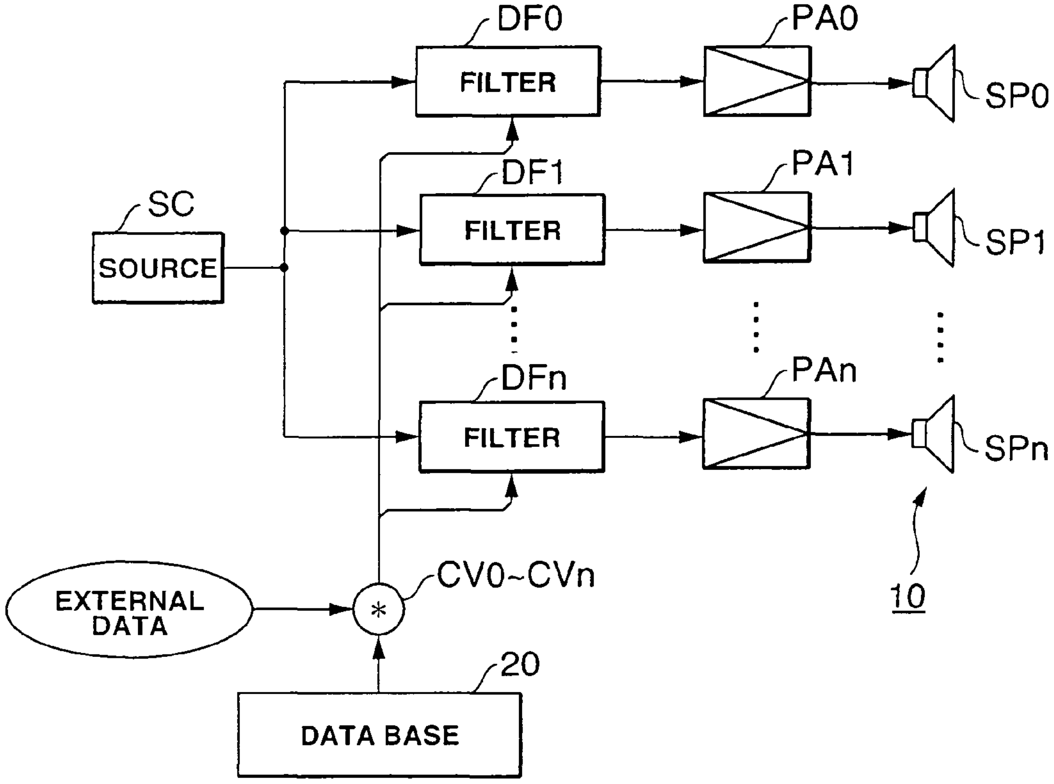
FIG. 24 is a schematic block diagram of an eighth embodiment of the audio signal processing system according to the present invention.

FIG. 24 shows a sound reproduction apparatus according to the present invention. This is a version of the sound reproduction apparatus shown in FIG. 23, in which the digital filters DF0 to DFn are to implement sound effects such as equalizing, amplitude (sound volume), reverberation, etc. On this account, external data is convoluted in convolution circuits CV0 to CVn to data taken out of the data base 20, and outputs from the convolution circuits CV0 to CVn are set for the FIR digital filters DF0 to DFn, respectively.

Of course, the delaying according to the present invention is not applied to the speaker array 10 alone. For example, application of the delaying to a channel divider used in a multi-way speaker system permits to finely adjust the position of a virtual sound source for a low-frequency speaker and high-frequency speaker. That is, a so-called time alignment can be done. Also, the delaying according to the present invention can be addressed to a desirable adjustment in units of mm of the depth-directional arrangement of a super-tweeter in a high-definition audio reproduction apparatus using SACD, DVD-Audio or the like.

Moreover, in this embodiment, data in the data base 20 may be pre-calculated and registered in a memory such as ROM or may be real-time calculated as necessary.

Also, to reduce the speed of calculating data in the data base 20, necessary resource for the calculation or the data amount in the memory, the sound reproduction apparatus may be so arranged that the data in the data base 20 is used for some of the focuses Ptg and intended directions while not being used for the other focuses and intended directions. For example, the focus Ptg can be positioned laterally of the listener LSNR without any problem even if the positioning accuracy is lower than that with which the focus Ptg is positioned in front of the listener LSNR. So, such an automatic control as not to use the data in the data base 20 or as to reduce the number of pulses Nps in the pseudo pulse train will permit to limit the total data amount and computational complexity.

Further, it is possible to automatically change the value Nov and number of pulses Nps according to the position of the focus Ptg and intended direction or the computational complexity and ability of the hardware in each case. Also, the effect of dynamic, real-time change of the position of the focus Ptg, intended direction, etc. for example can continuously be increased. Also in this case, the values Nov and Nps can dynamically be changed.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, to reproduce sound by a speaker array, the audio signal processing system according to the present invention increases the sound pressure in an intended position, reduces the sound pressure in a specified position and multiplies an impulse response for a position and direction in which the sound pressure should be decreased by a spatial window function to synthesize a sound. Therefore, it is possible to reduce, among others, a response in the middle and high frequency ranges in which the direction from which the sound wave comes (localization) can easily be perceived. At this time, the speaker array has not to be increased in scale, which means that the system according to the present invention is of a high practical use.

Also, for building up a multi-channel stereo sound field, a single speaker array can be used to implement a surround multi-channel stereo sound field, which is dedicated to a narrower space for installation of the speakers.

Moreover, by adopting a pseudo pulse train for setting each delay time, it is possible to set a delay time whose resolution is smaller than that of a unit delay time. Thus, the focus and intended direction are so definite that the sound image will be definitely localized. Also, since the sound pressure is lower at any other points than the focus and intended direction, which will also dedicate to a definite localization of the sound image.

The invention claimed is:

1. An audio signal processing method comprising the steps of:

supplying an audio signal to each of a plurality of digital filters, the digital filters corresponding to respective amplitude characteristics;

respectively supplying outputs from the plurality of digital filers to a plurality of speakers arranged in a speaker array to form a sound field;

setting a delay time in each of the plurality of digital filters so that transmission delay times with which the audio signal arrives at a first point in the sound field via each of the plurality of digital filters and each of the plurality of speakers will coincide with each other;

adjusting at least one amplitude characteristic of the plurality of digital filters such that the frequency response to the audio signal at a second point in the sound field is lower than the frequency response to the audio signal at the first point in the sound field, where the at least one amplitude characteristic is estimated by predicting a sample count of the signal at the second point and selecting effective ones of the amplitude characteristics corresponding to the sample count; and adjusting cut-off frequency of a variable high pass filter and the delay time in each of the digital filters based on the adjusted amplitude characteristics 2. The audio signal processing method according to claim 1, wherein a sound wave from the speaker array is caused to reach at least one of the first and second points after it is reflected by a wall surface.

3. The audio signal processing method according to claim 1, wherein when forming the first and second points in the sound field, a filter factor of each of the plurality of digital filters is determined by calculation and set for each of the plurality of digital filters.

4. The audio signal processing method according to claim 1, wherein when forming the first and second points in the sound field, a filter factor of each of the plurality of digital filters is read from a data base and set for each of the plurality of digital filters.

5. The audio signal processing method according to claim 1, wherein:

the predetermined delay time set for at least one of the plurality of digital filters is divided into an integer part and decimal part in units of a sampling period of the audio signal;

over-sampling an impulse response including a delay time represented by at least the decimal part of the predetermined delay time for a shorter period than a sampling period to provide a sample train, wherein the sample train is down-sampled to provide pulse-waveform data of the sampling period; and factor data is set for a part to be delayed by the plurality of digital filters based on the pulse-waveform data.

6. The audio signal processing method according to claim 5, wherein the audio signal is delayed by a part of the predetermined delay time, which is a multiple of the sampling period, by digital delay circuits which operate for the sampling period, while it is being delayed by the remainder of the predetermined delay time, which includes the decimal part by the digital filters.

7. The audio signal processing method according to claim 5, wherein:

an over-sampling period of the over-sampling operation is. 1/N (N is an integer larger than or equal to 2) of the sampling period of the digital signal; and when the delay time represented by the decimal part is nearly an integral multiple (m) of the over-sampling period, m/N is adopted as the decimal part.

8. The audio signal processing method according to claim 7, wherein:

the pulse-waveform data to be delayed by a delay time which is m/N (m =1 to N −1) of the sampling period is pre-stored in a data base; and pulse-waveform data approximate to the decimal part is taken out of the stored pulse-waveform data and set as a filter factor of each of the plurality of digital filters.

9. The audio signal processing method according to claim 5, wherein a transfer characteristic providing a predetermined acoustic effect is convoluted in the pulse-waveform data and set as a filter factor of each of the plurality of digital filters.

10. An audio signal processor comprising a plurality of digital filters, the digital filters corresponding to respective amplitude characteristics and each digital filter being supplied with an audio signal, wherein each of the plurality of digital filters supplies an output signal to each of a plurality of speakers arranged in a speaker array to form a sound field;

each of the plurality of digital filters has a delay time so that transmission delay times with which the audio signal arrives at a first point in the sound field via each of the plurality of digital filers and each of the plurality of speakers will coincide with each other; and each of the plurality of digital filters has an amplitude characteristic such that the frequency response to the audio signal at a second point in the sound field is lower than the frequency response to the audio signal at the first point in the sound field, at least one amplitude characteristic is estimated by predicting a sample count of the signal at the second point and selecting effective ones of the amplitude characteristics corresponding to the sample count;

the audio signal is passed through a variable high pass filter, the cut-off frequency of the variable high pass filter and the delay time in each of the digital filters are adjusted based on the estimated amplitude characteristics.

11. The audio signal processor according to claim 10, wherein a sound wave from the speaker array is caused to reach at least one of the first and second points after it is reflected by a wall surface.

12. The audio signal processor according to claim 10, wherein when forming the first and second points in the sound filter, a filter factor of each of the plurality of digital filters is determined by calculation and set for each of the plurality of digital filters.

13. The audio signal processor according to claim 10, wherein when forming the first and second points in the sound field, a filter factor o each of the plurality of digital filters is read from a data based and set for each of the plurality of digital filters.

14. The audio signal processor according to claim 10, wherein:

the predetermined delay time set for at least one of the plurality of digital filters is divided into an integer part and decimal part in units of a sampling period of the audio signal, there is further provided a calculation circuit to calculate pulse-waveform data of the sampling period by over-sampling an impulse response including a delay time represented by at least the decimal part of the predetermined delay time for a shorter period than the sampling period to provide a sample train, and down-sampling the sample train; and the pulse-waveform provided by the calculation circuit is set as a filter factor of each of the plurality of digital filters.

15. The audio signal processor according to claim 14, wherein:

an over-sampling period of the over-sampling in the calculation circuit is 1/N (N is an integer larger than or equal to 2) of the sampling period of the digital signal; and when the delay time represented by the decimal part is nearly an integral multiple (m) of the over-sampling period, n/N is adopted as the decimal part.

16. The audio signal processor according to claim 14, wherein a transfer characteristic providing a predetermined acoustic effect is convoluted in the pulse-waveform data to set synthetic-waveform data as a filter factor of each of the plurality of digital filters.

17. The audio signal processor according to claim 10, wherein:

the predetermined delay time set for at least one of the plurality of digital filters is divided into an integer part and decimal part in units of a sampling period of the audio signal;

there is further provided a storing means for storing pulse-waveform data of the sampling period provided by over-sampling an impulse response including a delay time represented by at least the decimal part of the predetermined delay time for a shorter period than the sampling period to provide a sample train, and down-sampling the sample train; and the pulse-waveform data stored in the storing means is taken out and set as a filter factor of each of the plurality of digital filters.

18. The audio signal processor according to claim 17, wherein:

an over-sampling period of the over-sampling is 1/N (N is an integer larger than or equal to 2) of the sampling period of the digital signal; and when the delay time represented by the decimal part is nearly an integral multiple (m) of the over-sampling period, m/N is adopted as the decimal part.

19. The audio signal processor according to claim 17, wherein:

a plurality of the pulse-waveform data corresponding to the decimal part is pre-stored in the storing means; and pulse-waveform data approximate to the decimal part is taken out of the stored pulse-waveform data and set as a filter factor of each of the plurality of digital filters.

20. The audio signal processor according to claim 17, wherein a transfer characteristic providing a predetermined acoustic effect is convoluted in the pulse-waveform data to set the pulse-waveform data as a filter factor of each of the plurality of digital filters.

* * * * *